H. L. PITMAN.
COMBINED TYPEWRITING AND COMPUTING MACHINE.
APPLICATION FILED MAR. 13, 1919.
1,417,106.
Patented May 23, 1922.
10 SHEETS—SHEET 7.
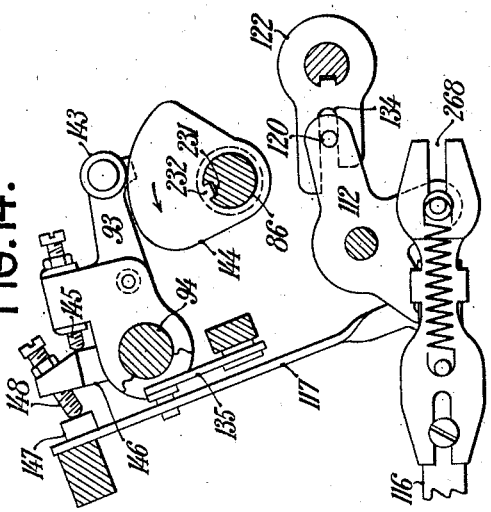
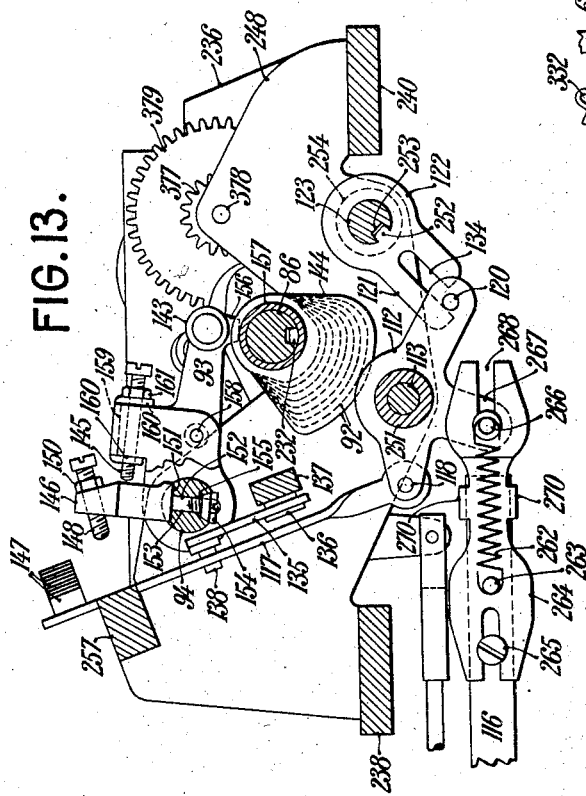
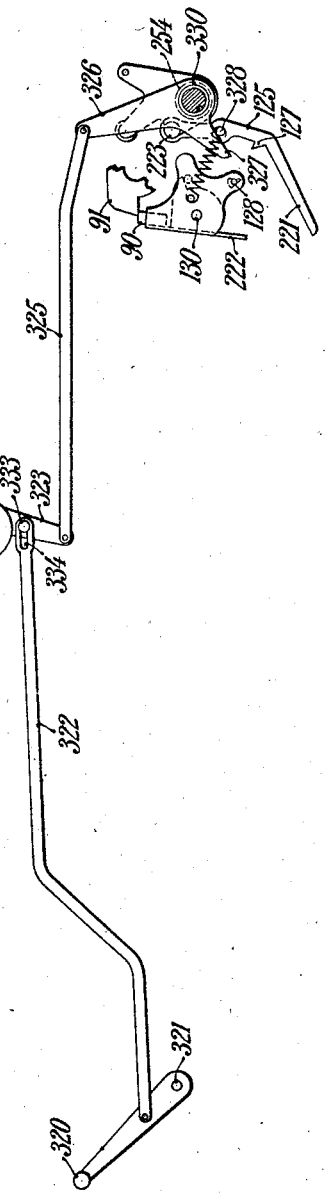
INVENTOR:
Henry L Pitman
BY
B E Stickney
ATTORNEY.

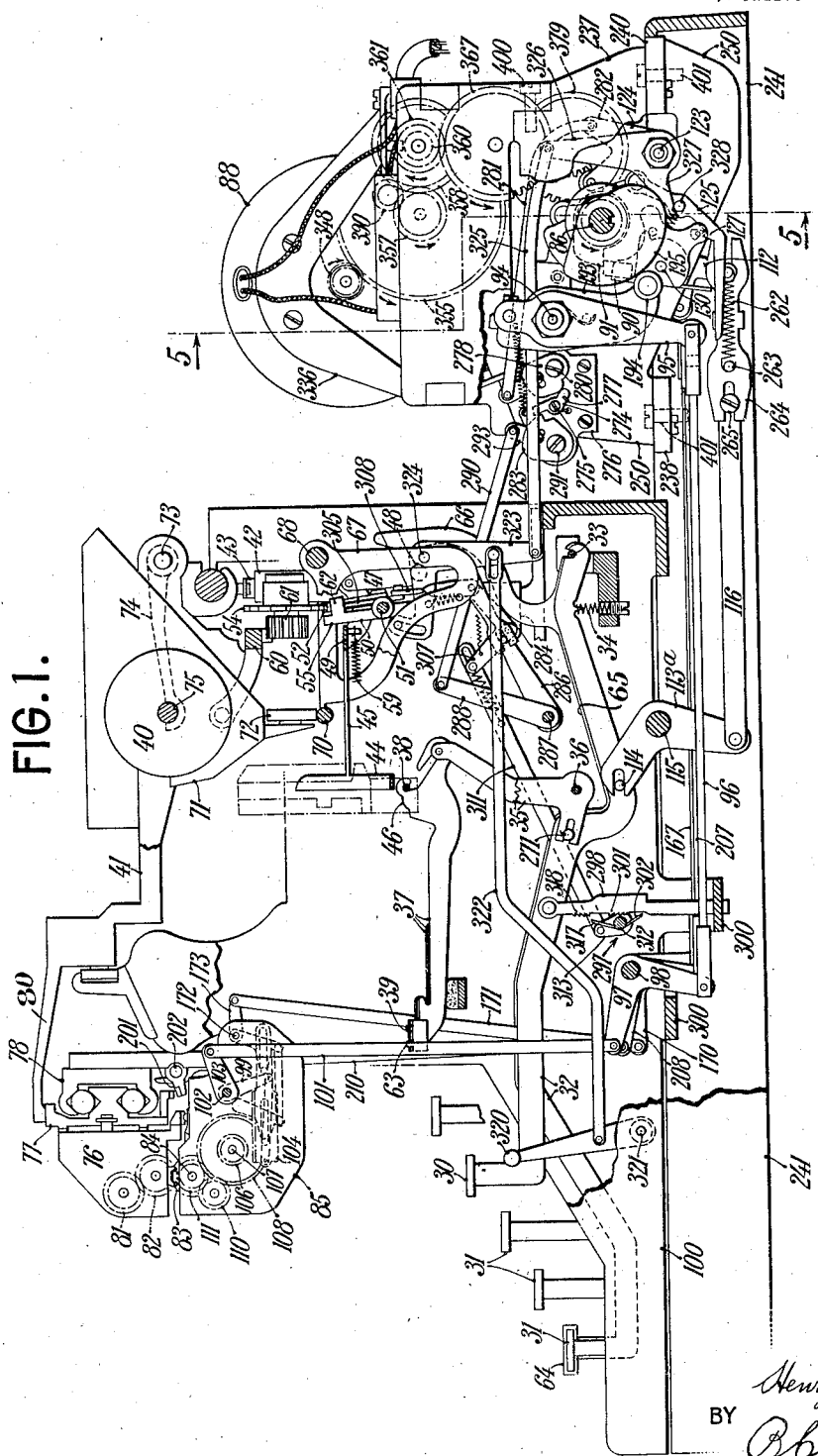

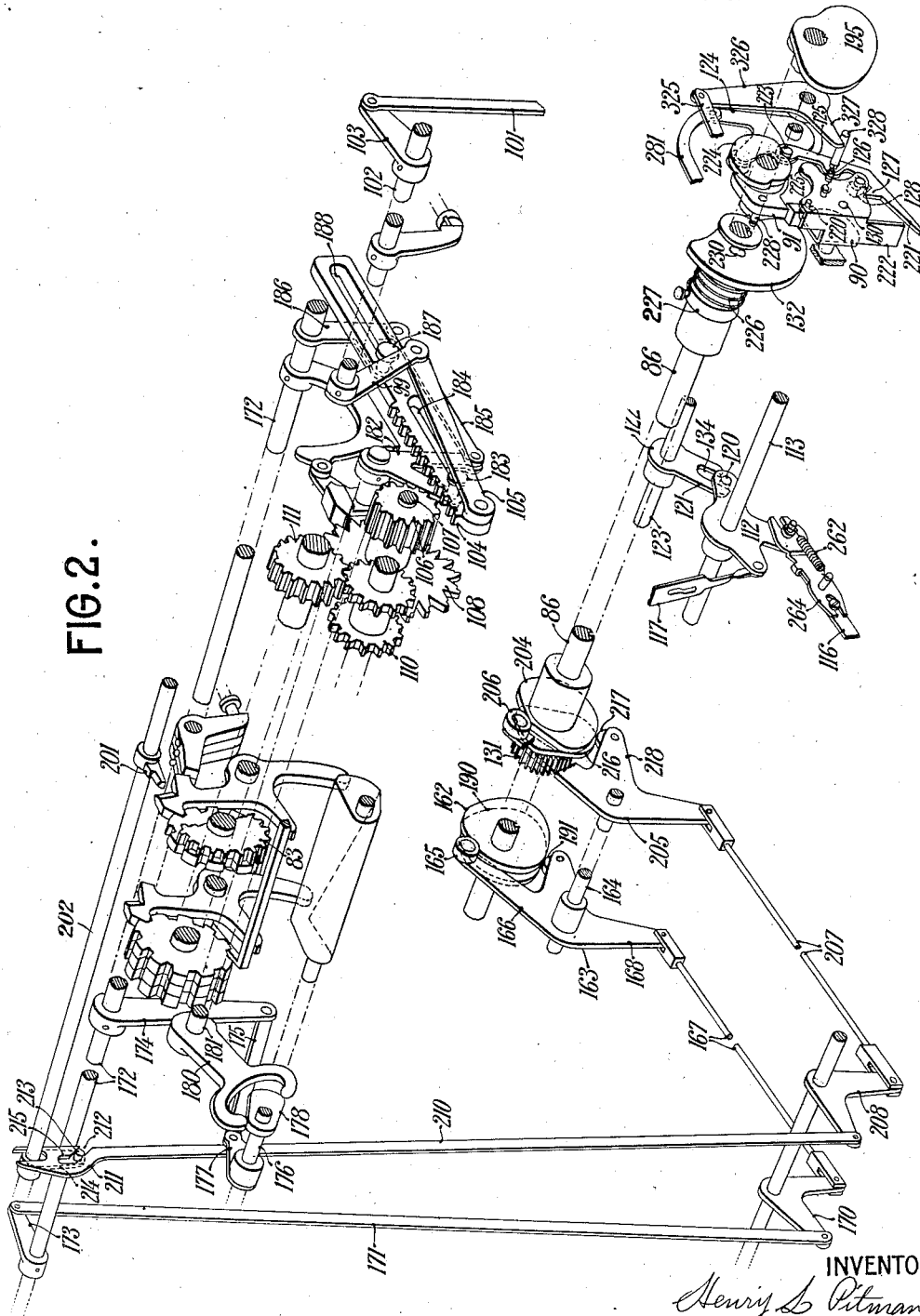

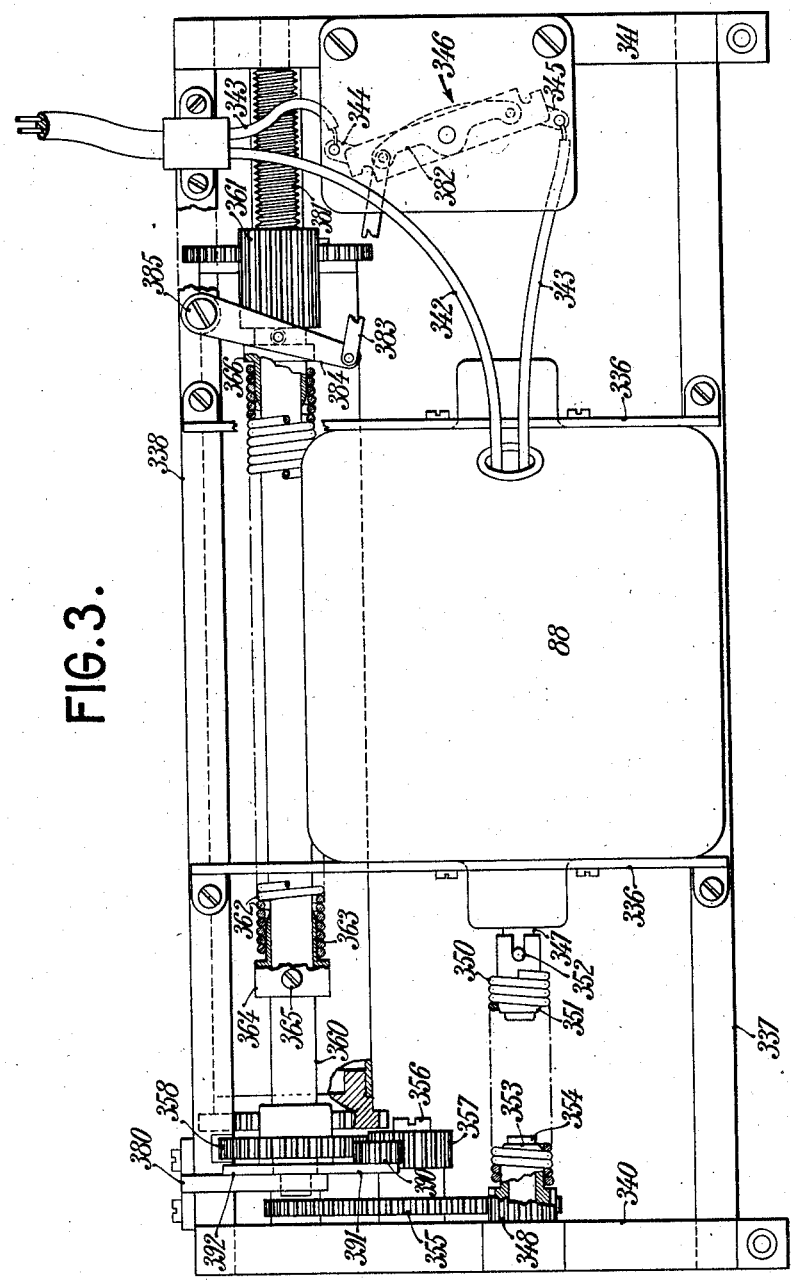

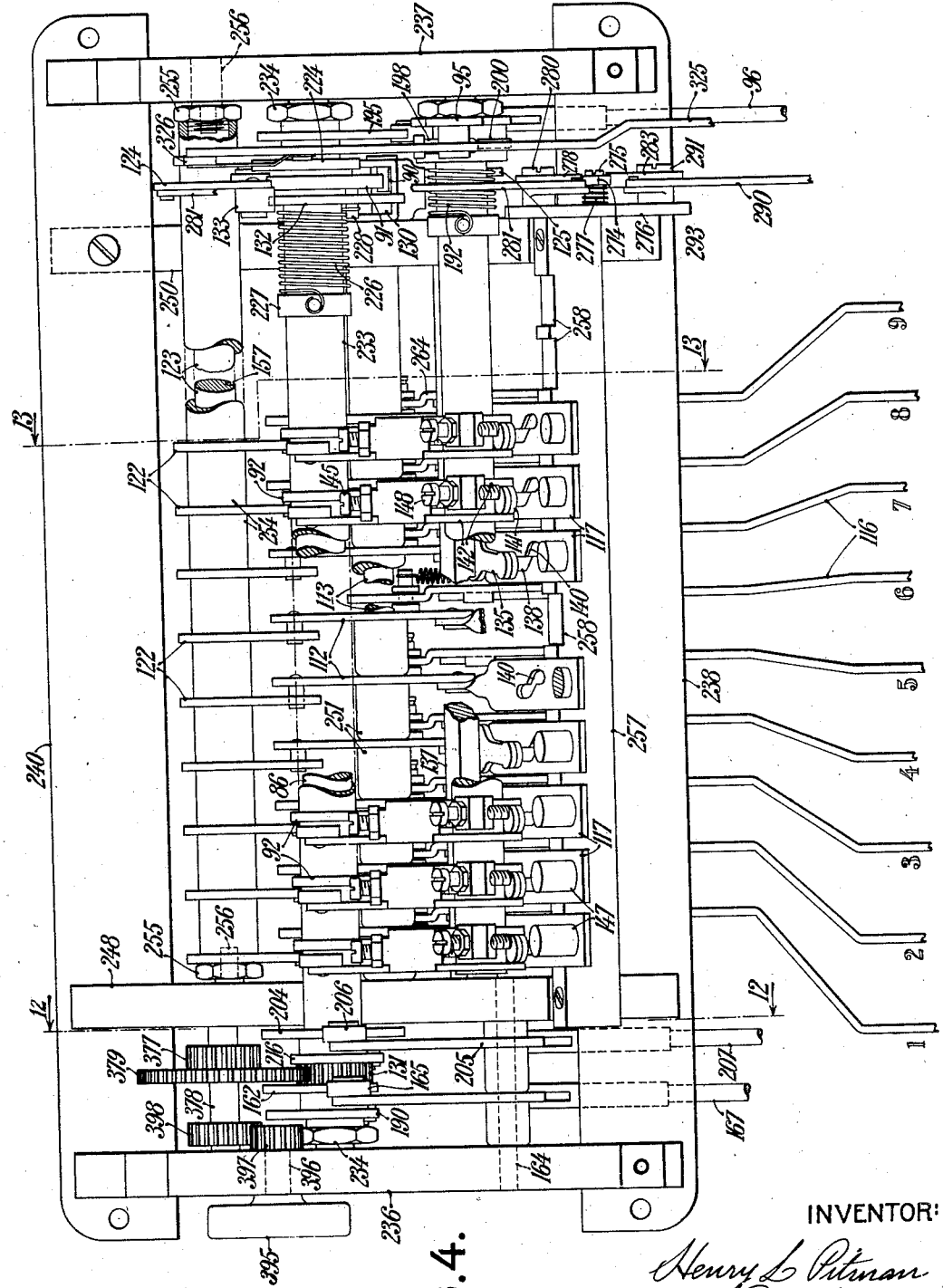

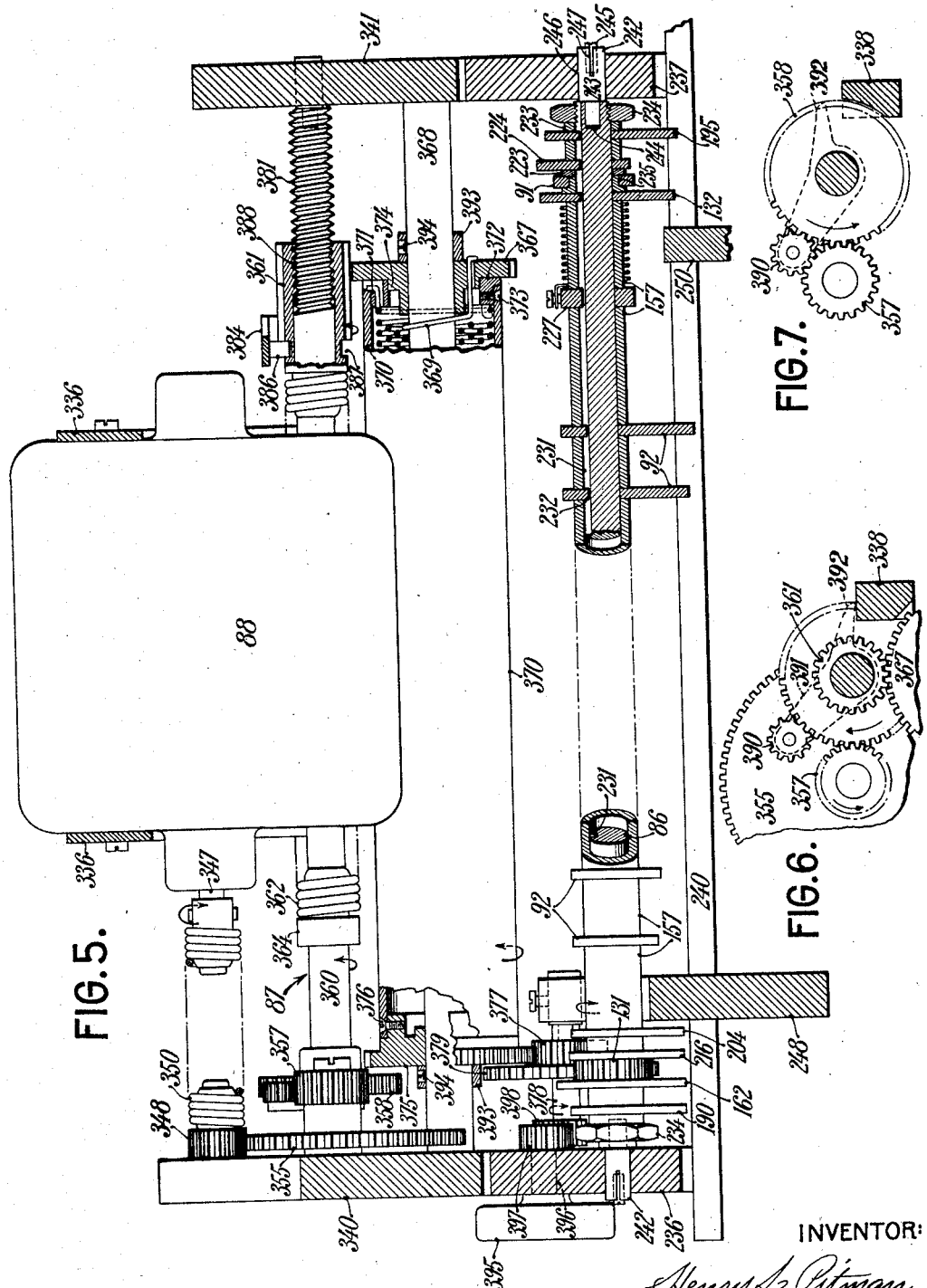

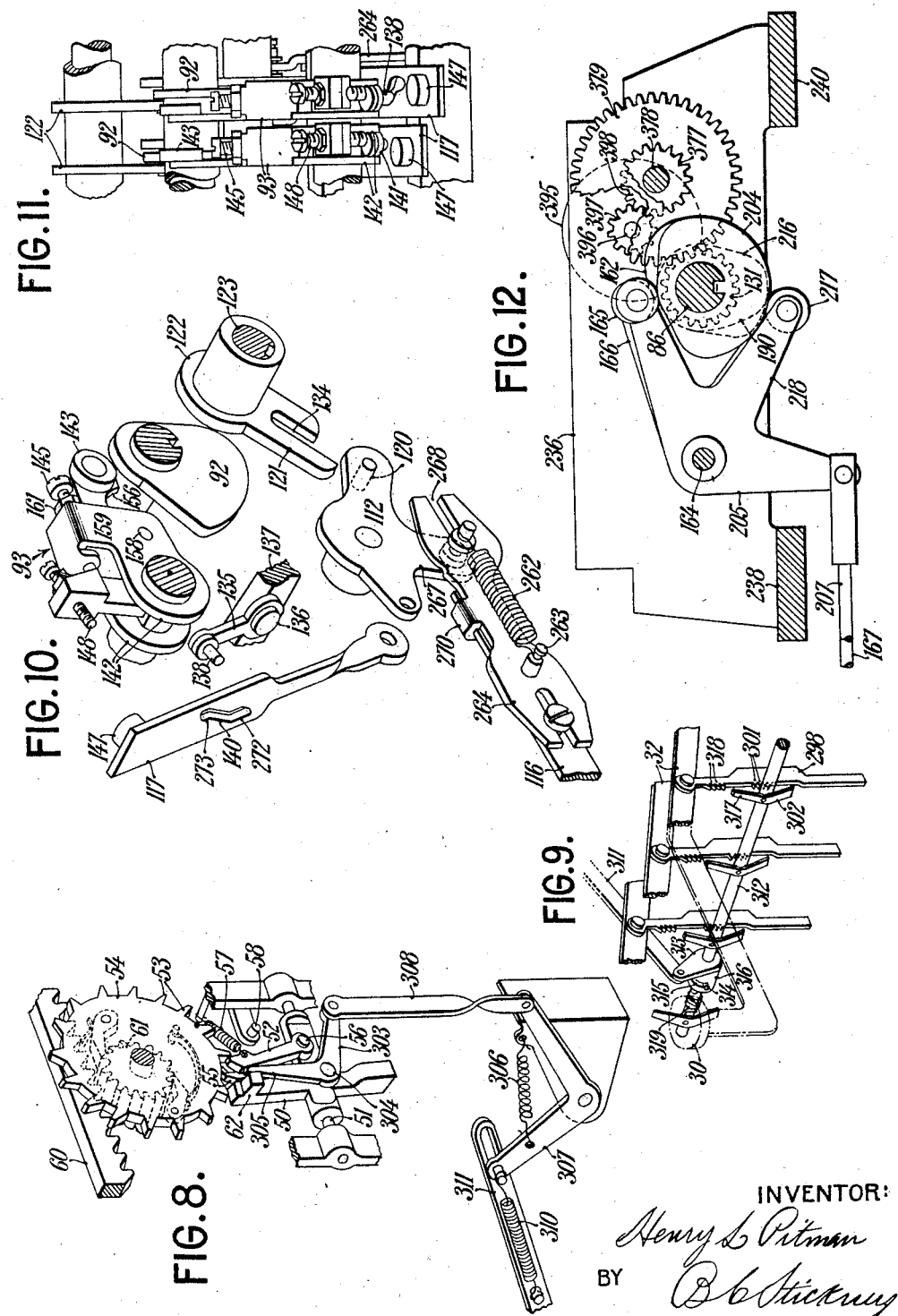

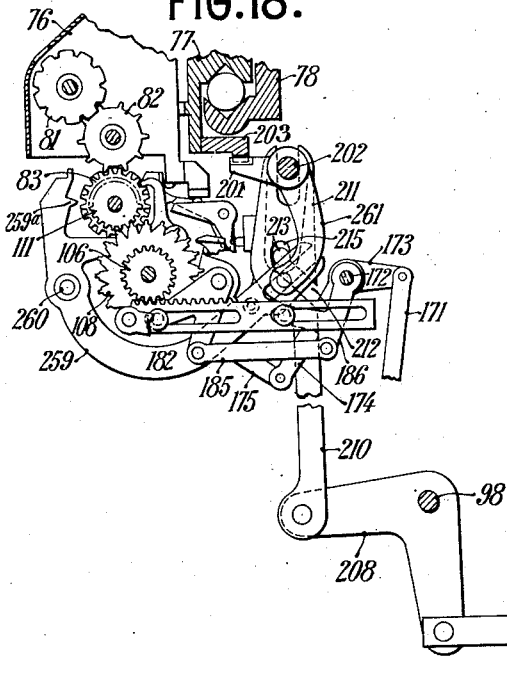
FIG. 18.
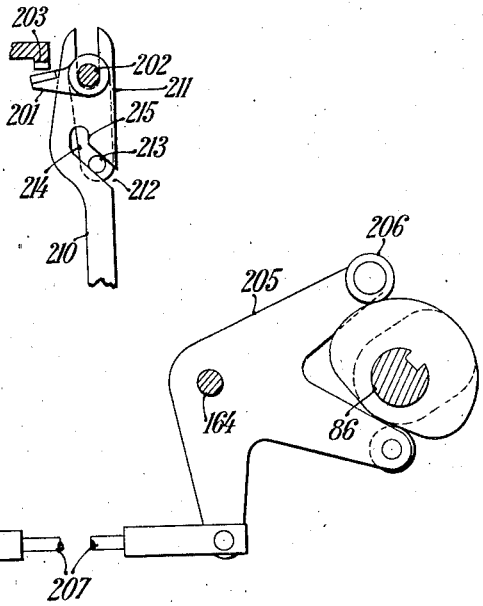
FIG. 19.
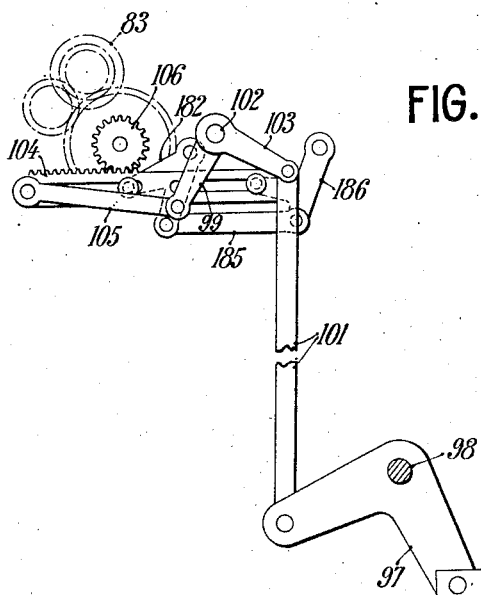
FIG. 20.
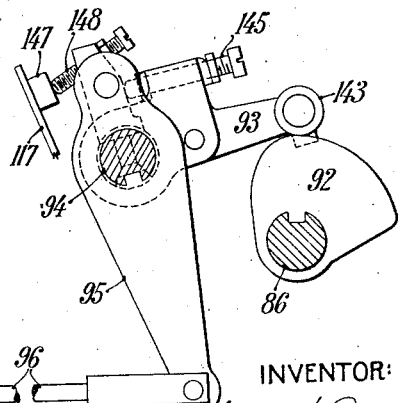

H. L. PITMAN.
COMBINED TYPEWRITING AND COMPUTING MACHINE.
APPLICATION FILED MAR. 13, 1919.
1,417,106.
Patented May 23, 1922.
10 SHEETS—SHEET 10.
FIG. 21.
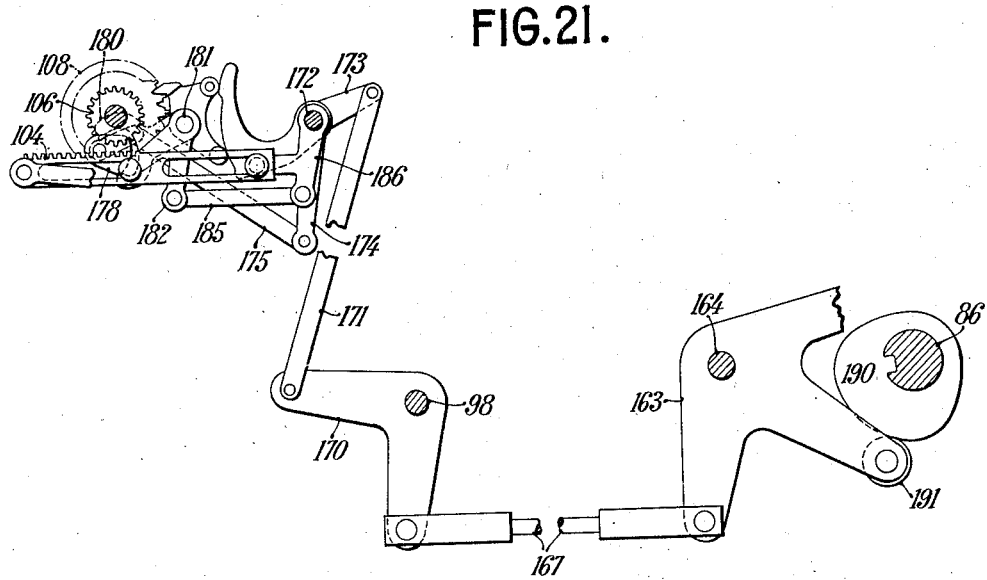
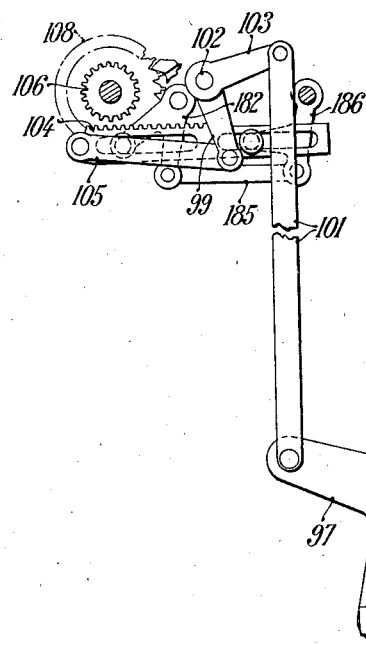
FIG. 22.
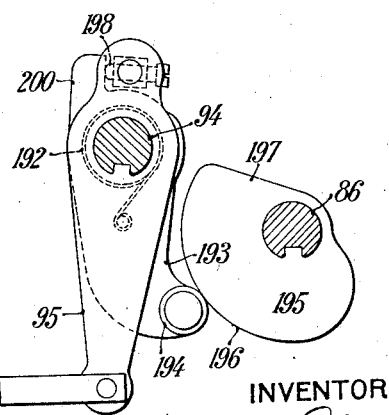
INVENTOR:
Henry L. Pitman
BY B. L. Stickney
ATTORNEY.

UNITED STATES PATENT OFFICE.

HENRY L. PITMAN, OF ELIZABETH, NEW JERSEY, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,417,106.     Specification of Letters Patent.     Patented May 23, 1922.

Application filed March 13, 1919. Serial No. 282,277.

*To all whom it may concern:*

Be it known that I, HENRY L. PITMAN, a citizen of the United States, residing in Elizabeth, in the county of Union and State of New Jersey, have invented certain new and useful Improvements in Combined Typewriting and Computing Machines, of which the following is a specification.

This invention relates to combined typewriting and computing machines, of the kind disclosed in the application of Gustave O. Degener, No. 201,626, filed November 12, 1917, now Patent No. 1,347,621, granted July 27, 1920, and in my application, No. 24,390, filed April 28, 1915 (now Patent No. 1,308,506, granted July 1, 1919).

The invention is illustrated in connection with the standard Underwood Addendagraph combined typewriting and computing machine, but it is not confined thereto. The computing mechanism is of the masterwheel type, the master wheel being driven by a reciprocatory rack having suitable operating connections from power-driven, key-controlled mechanism.

The letter-spacing movements of the typewriter carriage produce relative movements between the master wheel and the computing wheels, so that numbers may be run into the totalizer, order by order, under control of the number type-keys.

Upon depression of any number type-key, the valuating device corresponding therewith is brought into co-operative relation with said rack which drives the master wheel. The computing mechanism is driven from a spring motor, which is released upon each depression of a number key and caused to complete one cycle of movement, as a result of which the master wheel is caused to rotate the computing wheel with which it may engage, to an extent corresponding to the particular number key depressed.

The spring motor is re-wound by an electric motor when the motor is about exhausted; the motor circuit being automatically re-opened when the spring motor is fully re-wound.

It has been heretofore proposed, in devices of the above-mentioned character, to have the number key merely release or trip the motor-driven mechanism, and to have the motor-driven mechanism supply all of the energy for operating the computing mechanism and for also positively driving the type-bars and causing them to print. This would make the touch of the computing keys lighter than the touch of the alphabet keys. In other words, the touch of the number key would be lighter when used in connection with the computing mechanism than when simply typing a number. If the power-driven mechanism should be coupled directly to the type-bar mechanism, upon the initial depression of a number key, the parts connected with the number key would be moved by said power-driven mechanism rapidly away from the finger, and then would be forcibly returned before the finger could be removed.

In overcoming the above-mentioned objections, I provide power-driven means to actuate the computing mechanism, and cause the number keys merely to act to release the power-driven mechanism; the latter is ineffective to complete the printing action of the type-bar, so that, when computing, the number type-keys must be struck with substantially the same touch as is required for the alphabet keys. To do this, the number keys are yieldingly connected to the actuating mechanism by springs which are counteracted by a spring connected to a universal bar associated with the escapement mechanism. This results in uniformity of touch between the number keys and the alphabet keys, and makes the touch of the number key the same during computing operations as during non-computing operations.

Provision is made to prevent any possibility of repeated printing and feeding of the typewriter carriage without computing, by locking the typewriter carriage against feeding movement. This is preferably done by locking the carriage-escapement devices in their actuated position, and consequently holding the typewriter carriage until the latter part of the return stroke of the type-action, when the locking means is actuated to release the carriage-escapement devices, said means being under the control of the number keys.

A full-stroke device is provided for the number keys, which is actuable by means controlled by the escapement devices, to render it effective for the down and up strokes of the number keys, compelling the operative, in order to restore a depressed key to its normal position, to fully depress the same and either actuate the escapement mechanism and print the number computed, or actuate the escapement mechanism without printing. On the return stroke of the key, the full-stroke device is effective to prevent a repeated actuation of said key before the locking means for the escapement mechanism has been released to permit the carriage to feed.

Improved means is also provided to lock the carriage, for maintaining co-operative relation between the master wheel and the computing wheel. The locking means may comprise a pawl and an actuating element therefor which may be actuated by the power-shaft; the connection between the pawl and the actuating element being such as to prevent any possible back pressure against the power-shaft from said pawl when the latter is in its actuated position.

Simplified and improved means is provided to silence or render ineffective the computing mechanism, so that numbers may be typed without computing the same; provision being made so that the silencing means may be actuated by a non-compute key and by a case-shift key.

Simplified and improved means is provided in the connections from the electric motor to the spring motor, and the means for operating the switch for the electric motor.

Means is provided to prevent the spring motor from unwinding from the end at which the energy is stored. This means comprises a check which is automatically rendered ineffective when the energy is being stored in the spring motor, said check being made automatically effective to lock a train of connections between the electric motor and spring motor, thereby preventing the spring motor from giving off its energy to the electric motor, when the latter is at rest.

A finger-piece is provided by which the actuating and valuating mechanism may be reversely rotated to restore it to its normal position in case the mechanism becomes blocked.

To reduce noise and shock, and consequently wear and tear between co-operating parts of the machine to a minimum, yielding connections have been provided between some of the co-operating parts.

An effort has been made to simplify and reduce the number of parts of the machine and to render certain parts readily adjustable, thereby reducing to a minimum the necessity of accurately constructing the parts, and consequently reducing the cost of manufacture of the machine.

Other features and advantages will hereinafter appear.

In the accompanying drawings,

Figure 1 is a side elevation of the machine, as viewed from the right, certain parts being broken away, and parts being omitted for the sake of clearness.

Figure 2 is a diagrammatic, perspective view, showing the releasing means for the power-driven mechanism and certain of the parts of the actuating mechanism and locking mechanism, all of said parts being indicated in their normal positions.

Figure 3 is a top view of the motor-set, including the spring motor, the electric motor and the switch, and the switch-operating means for controlling the supply of energy from the electric motor to the spring motor.

Figure 4 is a top view of the valuating and actuating mechanism, which is located under the motor-set, the latter being removed and all parts being represented in their normal positions, and certain parts being broken away for the sake of clearness.

Figure 5 is a sectional front view, taken on the line 5—5 of Figure 1, and shows the motor-set, the connections between the electric motor and the spring motor, and the connections between the spring motor and the valuating and actuating mechanism, some of the parts being omitted for the sake of clearness.

Figure 6 is a detail view of the check between the spring motor and the electric motor, and shows the ineffective position to which the check is automatically moved while energy is being stored in the spring motor.

Figure 7 is a view similar to Figure 6, and shows the check effective to prevent any backward rotation of the gear connected to the spring motor.

Figure 8 is a skeleton perspective view, as seen from the back of the machine, of the escapement devices, and shows part of the mechanism controlled thereby for shifting the full-stroke device associated with the number keys.

Figure 9 is a skeleton perspective view of some of the number key-levers and the full-stroke device.

Figure 10 is a detail view, in perspective, of parts of the valuating and actuating mechanism, the parts being disassembled for the sake of clearness.

Figure 11 is a fragmentary top view of parts of the valuating and actuating mechanism corresponding to two different values, the part at the right being represented in its normal position, and that at the left being represented in its actuated position, as when selected for operation by the depression of a number key.

Figure 12 is a sectional view, taken on the line 12—12 of Figure 4, looking in the direction of the arrows at said line and showing part of the train of gearing for transferring energy from the spring motor to a power-shaft or cam-shaft, and also showing the cams and followers which control the operation of various locking devices of the computing mechanism, said parts being shown in their normal positions. The means by which the power-shaft may be restored to its normal position is also shown in this view.

Figure 13 is a sectional view, taken on the line 13—13 of Fig. 4, looking in the direction of the arrows at said line, and showing the valuating and actuating mechanism, and the yielding element for connecting parts of said mechanism to the number keys and type-bars, all parts being shown in their normal positions.

Figure 14 is a view of part of the same mechanism as in Figure 13, showing the parts after a number key has been depressed to select its corresponding valuating member, the valuating cam and the parts operated thereby being indicated in their effective operating positions.

Figure 15 is a detached view of the disconnect or non-compute key, and mechanism controlled thereby, for rendering the computing mechanism ineffective when it is desired to print without computing; a connection being also shown for operating the disconnect mechanism from the case-shift mechanism, the parts being shown with the motor-releasing device moved to its ineffective position.

Figure 16:
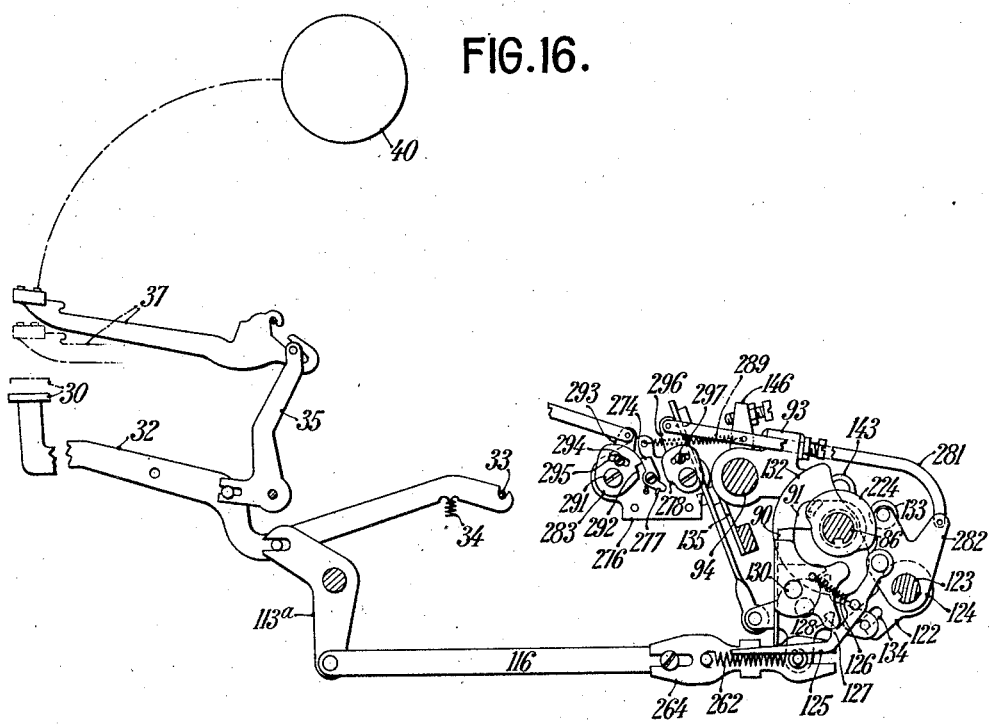

Figure 16 is a skeleton diagrammatic view of the actuating mechanism controlled by the number keys; the parts being shown with a key slightly depressed, and sufficient to release the power-shaft, the escapement lock being rendered effective and in readiness to lock the typewriter-escapement on full depression of said key.

Figure 17:
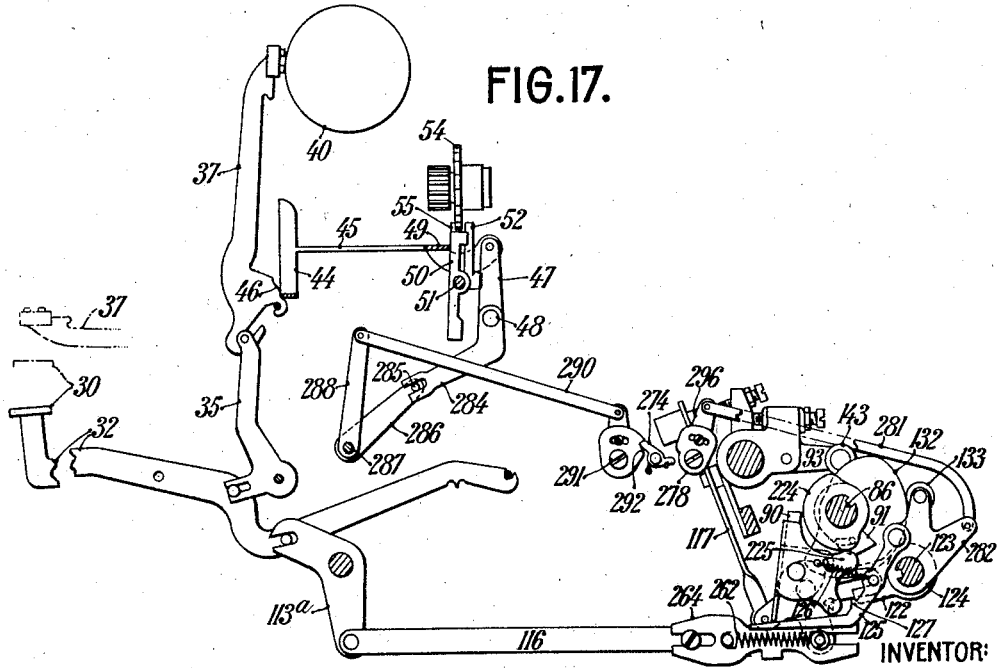

Figure 17 is a skeleton diagrammatic, detached view of the same mechanism shown in Figure 16; the co-operating parts of the typewriter-escapement mechanism being shown in the positions they assume after the number key has been completely actuated, and shows the typewriter-escapement mechanism locked in its actuated position.

Figure 18 is a skeleton diagrammatic view of part of the master-wheel-operating mechanism, together with a carriage-lock for preventing relative sidewise movement between the master-wheel and the computing wheels, during a computing operation, and various locks for controlling the movements of the computing mechanism, said carriage-lock and the associated locking mechanism being indicated in the positions which they assume during the rotation of a computing wheel by the master wheel.

Figure 19 is a detail view of part of the operating mechanism for the carriage-lock and its associated parts in their normal positions.

Figure 20 is a skeleton diagrammatic view of one of the valuating cams and the train of mechanism operated thereby, for effecting an extent of rotation of the master wheel corresponding in value to the number represented by said cam.

Figure 21 is a diagrammatic view of a cam and mechanism operated thereby, for lowering the master-wheel-driving-rack out of driving relation with the master wheel, in preparation for its return to normal position after a computing operation has been effected.

Figure 22 is a detached view of the cam and associated mechanism by which the master-wheel-driving-rack is returned to its normal position, after it has been lowered out of engagement with its associated pinion, by the mechanism illustrated in Figure 16.

Number type-keys 30 and alphabet type-keys 31 swing key-levers 32 about their fulcrum 33, against the tension of adjustable return springs 34, to rock bell-cranks 35, about their common fulcrum 36; the upper ends of said bell-cranks being effective to swing type-bars 37 upwardly and rearwardly about their fulcrum 38, to cause types 39 to print against a work-sheet (not shown), carried by a cylindrical platen 40, rotatably supported in a carriage 41. The carriage is constantly urged from right to left of the machine by means of a spring drum 42 connected thereto by a suitable strap 43; the carriage being permitted to move in said direction, during printing operations of the type-bars 37, by means of escapement devices including a curved universal bar 44, forming part of a floating frame 45, which is moved rearwardly during the latter part of the printing stroke of the type-bars by heels 46, on the type-bars, adapted to engage the universal bar 44. The frame 45 is carried at its rear end by a pivoted frame 47, comprising a rock-shaft 48, and is provided with a cross-bar 49 which engages with a dog-rocker 50 to swing the upper end thereof rearwardly about its pivot 51, to move a loose dog 52, carried thereby, out of engagement with one of the teeth 53 (Figures 1 and 8), on an escapement wheel 54 and bring a fixed dog 55 into the path of the previously-engaged tooth 53. (Figure 17). The loose dog 52, after it becomes disengaged from the tooth 53, is swung about its pivot 56 and towards the right in Figure 8, by means of a spring 57, and is arrested by a stop 58; the escapement wheel being at this time held by the fixed dog 55. Upon the return movement of the universal bar, which is caused by the usual return spring 59, the loose dog enters the space between the previously-engaged tooth and the next tooth; the escapement wheel then becomes released from the fixed dog 55 and is rotated by means of the spring drum through the intermediary of a pivoted rack 60 on the typewriter carriage, which rotates a pinion 61 having the usual one-way connection with said escapement wheel. During this movement, the next tooth of the escapement wheel engages the loose dog to swing it about its pivot 56 against the tension of the spring 57, connected thereto, until it is finally arrested by a fixed stop 62 at the upper end of the dog-rocker 50; the carriage having at this time moved through one letter-space position.

The platen may be shifted from lower to upper-case position, so as to print with upper-case types 63. For this purpose, there is provided the usual case-shift key 64, which, when depressed, swings a lever 65 and an arm 66 thereon about the fulcrum rod 33, the arm engaging to swing a shift-frame 67 about its pivot 68. The shift-frame comprises a rail or bar 70 which is moved upwardly to shift a platen-carrying frame 71, through the intermediary of a roller 72, secured to said frame, and which normally travels back and forth on said shift-rail. The platen is supported in said platen-frame and may be assisted in its upward movements by the usual counterbalance spring (not shown), which is usually coiled around a rock-shaft 73, supported on the carriage 41; said rock-shaft having forwardly-projecting arms 74 secured thereto, one at each end thereof, said arms engaging at their forward ends with a shaft 75 comprising the platen axle.

The computing mechanism may comprise one or more computing heads or totalizers 76, adjustably mounted on a computer-carriage or truck 77, arranged to travel on a fixed guide-rail 78, and with the typewriter carriage 41; the computer-carriage and the typewriter carriage being connected to each other for this purpose by one or more arms 80. Each totalizer may comprise a plurality of dial wheels 81, arranged in denominational order; said dial wheels 81 being in driving relation with intermediate computing wheels 82, which, as the carriage passes through a computing zone, are brought seriatim into effective relation with a master wheel 83. The master wheel is secured to a shaft 84, rotatably supported in an actuator 85, and may be rotated either additively or subtractively, by driving mechanism under the control of the number keys 30, which will hereinafter be described.

The valuating and actuating mechanism, which is preferably located at the back of the machine, may comprise a power-shaft or driving shaft 86 (Figures 1 and 5), which is constantly urged in a counterclockwise direction by means of a spring motor 87, which may be automatically wound by an electric motor 88 in a manner hereinafter clearly described. The power-shaft 86 is prevented from rotating, however, by means of a holding pawl 90 which engages with a dog 91 connected to said power-shaft, said pawl 90 being under the control of the number keys. The power-shaft 86 has rigidly secured thereto a set of valuating cams 92 (Figures 4, 5 and 13), one for each number key, from "1" to "9", inclusive. Each valuating cam has associated therewith an interponent 93 which, at the depression of the corresponding number key 30, is brought into effective relation with its valuating cam by suitable indexing mechanism, hereinafter described, so that said interponent may be swung in a counterclockwise direction, by said cam upon the rotation of the power-shaft, after a release of said shaft is effected by the number key, to rock a valuating shaft 94 through an angular distance equal in value to the associated valuating cam. The valuating cams are of different heights (Figure 13), and consequently the valuating shaft 94 may be moved through different angular distances, by means of the various valuating cams. These movements of the valuating shaft 94 may be transmitted to the master wheel 83 by means including a downwardly-extending arm 95 (Figures 1 and 20), secured near the right-hand end of the valuating shaft 94, said arm having connected thereto a link 96, which is drawn rearwardly to swing a bell-crank 97, about a rod 98, upon which it is pivotally supported; the rod 98 being conveniently supported in a main frame 100 of the typewriter. The bell-crank pulls downwardly on a link 101 to rock a shaft 102 by means of an arm 103, extending rearwardly therefrom and connected to the link 101. The shaft 102 extends into the actuator 85 and has secured at its inner end a downwardly-extending arm 99, which is effective to move a driving rack 104 forwardly by means of a connecting link 105 (Figures 2 and 20), the driving rack having previously been moved into effective meshing relation with a pinion 106, from the position indicated, in Figures 1 and 2, by suitable means hereinafter described. The pinion 106 is rigidly secured to a shaft 107, which has also a large gear-wheel 108 secured thereon, the latter being adapted to mesh with either one of the pinions 110, 111, according to whether the machine is set for addition or subtraction, as shown and described in my co-pending application, Serial No. 81,574, filed March 2, 1916 now Patent No. 1,345,102 granted June 29, 1920, and thus rotate the master wheel additively or subtractively through an angular distance, corresponding in value to the actuated number key 30.

The interponents or intermediate elements 93 are slidingly mounted on the valuating shaft 94, so that they may be moved axially thereon into effective relation with the associated valuating cams by suitable indexing devices under the control of the number keys. For this purpose, each number key has connected thereto a three-armed member 112, pivotally supported on a rod 113; the connection comprising a bell-crank 113ª connected to the number key-lever at 114, which is adapted to swing about a rod 115, in a counterclockwise direction, to push a connecting link 116 rearwardly and swing the three-armed member 112 in a counter-clockwise direction. An indexing element, in the form of a cam slide 117, is connected to each three-armed member 112 at 118 to be moved downwardly thereby, as will hereinafter appear. A slight depression of the number key 30, as shown in Figure 14, and consequently a slight actuation of the three-armed member is effective to release the power-shaft, the latter then being effective to cause the indexing and valuating of the number corresponding in value to the actuated number key.

To release the power-shaft 86, pins 120 are provided (Figures 2 and 13) on the three-armed members 112, which normally rest against the upper prongs 121 of forked members 122 to rock a shaft 123, upon which they are rigidly mounted. The rock-shaft or motor-release-shaft 123 is moved in a clockwise direction by said three-armed members to rock a bell-crank 124 (Figure 16), suitably secured to the right-hand end of said shaft, to pull a link or actuating member 125 against the tension of a spring 126 connected between said link and the holding pawl 90. The actuating member 125 is provided with a tooth 127, which engages with a tooth 128 on the holding pawl 90 to swing the latter in a counterclockwise direction about its pivot 130, and out of the path of the dog 91 on the power-shaft 86, thus releasing the power-shaft, so that it may be rotated by the spring motor which is connected to said power-shaft through the medium of a pinion 131 secured to the power-shaft (Figures 5 and 12). During the first part of the rotation of said power-shaft 86, a cam 132, secured thereto and near the right hand thereof, engages with a roller 133 on the bell-crank 124, by which the motor-release-shaft 123 is then rocked. Just prior to the instant of release of the power-shaft 86 (Figure 16), the pin 120 on the three-armed member 112 enters a slot 134 in the forked member 122, and thus becomes coupled to the motor-release-shaft 123. It will be seen that a continued movement of the rock-shaft, which is now caused by the cam 132, is effective to rock the three-armed member to pull the cam-slide 117 to effect an indexing operation of the corresponding interponent 93 on the valuating shaft, or, in other words, bring said interponent into effective relation with the associated valuating cam 92 on the power-shaft 86. To do this, the downward movement of the cam-slide 117 is effective to swing a member 135 (Figures 4, 10 and 13), pivotally mounted at 136 on a cross-bar 137; the member 135 being connected to said slide 117 by means of a pin 138 projecting from the member 135 and into a cam-slot 140 in said slide. The upper end or head 141 of the member 135 engages between two sides 142 of the interponent 93 to move it laterally and lengthwise of the valuating shaft 94, to bring a roller 143, on said interponent, into effective relation with the valuating cam 92 on the power-shaft 86 (Figure 11).

The movements of the various parts are so timed that the roller 143 on the interponent 93 is moved into effective relation with the valuating cam 92 before the power-shaft 86 has rotated sufficiently to bring the cam portions 144 of the valuating cam into engagement with the roller 143; in other words, the indexing operation is first accomplished, after which the value of the number is transferred to the valuating shaft 94. When the cam portion 144 engages the roller 143, the interponent 93 is swung in a counterclockwise direction (Figure 14), and through the intermediary of an adjusting screw 145, the purpose of which will presently be described, engages with a standard 146 secured to the valuating shaft, to rock the latter until it is arrested by a stop or abutment 147 on the associated cam-slide 117; the stop 147 having previously been lowered into the path of a set screw 148 (Figure 14) on the standard 146.

The adjusting screws 148 are provided to permit adjustments of the valuating shaft relatively to the stops 147, which are of different lengths, so that the shaft may be accurately stopped in the various positions to which it may be rocked by the valuating cams 92. The adjusting screws 148 are threaded into the standards 146 and are held in their adjusted positions thereon by lock nuts 150. It will be seen that by the individual adjusting screws 148, any inaccuracy which may be due to the manufacture of the various parts entering into the arresting of the valuating shaft may be readily overcome.

To rigidly secure the standards 146 on the valuating shaft 94, the latter has flats 151, formed thereon, (Figure 13), on which the standards 146 are seated; each standard having a shank 152, which passes through a hole 153 in the shaft, and receives a tapered nut 154, at its lower end, which jams into a tapered part 155 of the hole 153 when the nut is tightened on said shank, to avoid any possibility of the nut becoming loose by vibrations caused by the actuation of the machine. It will be seen that the part of the standard 146 nearest to the shaft 94 is narrower than the upper part through which the set screw 148 is threaded. This permits the interponent to move laterally on the shaft during an indexing operation.

The interponents 93 are provided with projections 156, which normally rest against sleeves or collars 157 on the valuating shaft. Each interponent comprises two walls 142 which may be joined together by a bolt 158 and a bridge 159 (Figures 10 and 13); the latter having two downwardly-bent ears 160 through which the set screw 145 is threaded. It will be seen that by means of the adjusting screws 145, the interponents are adjustable relatively to the standards 146, so that there will be no binding or lost motion of the parts between the valuating cam 92 and the stop 147 when the interponent 93 has been actuated its full extent (Figure 14). The set screws 145 may be held in their adjusted positions by lock nuts 161.

The various movements of the valuating shaft 94 are transmitted to master wheel 83, as hereinbefore described, by means including the arm 95.

It is preferable to have the driving rack 104 normally out of co-operative relation with its associated pinion 106. From this it follows that it is first necessary to raise the rack 104, from its Figure 1 position, into effective relation with the pinion 106, Figure 18. This is done during the early part of the rotation of the power-shaft, and may take place during the indexing of the interponent 93. To raise the rack 104, there is provided near the left-hand side of the power-shaft 86 a lifting cam 162 (Figure 2), which is effective to rock a bell-crank 163 about a supporting rod 164, through the intermediary of a roller 165 on an arm 166 of said bell-crank. The bell-crank 163 pulls rearwardly on a link 167, connected to a downwardly-projecting arm 168 of said bell-crank, to rock a bell-crank 170 about the rod 98. The bell-crank is adapted to pull downwardly on a link 171, to rock a shaft 172, by means of an arm 173, secured thereto, to which the link 171 is connected. Said shaft is conveniently supported near the upper and forward part of the machine, and has secured thereto a downwardly-extending arm 174, which is swung in a clockwise direction to push a link 175, and rock a shaft 176 in a counter-clockwise direction by means of an arm 177 extending from said shaft and connected to said link 175. The shaft 176 has secured thereto a cam 178 engaging with a forked arm 180 to swing the latter and rotate a shaft 181 from which said forked arm extends in a clockwise direction. The rock-shaft extends into the actuator 85 and has secured thereto, at its inner end, a bell-crank 182, which rocks with the shaft 181 in a clockwise direction to raise the driving rack 104 by means of a headed stud 183, on said bell-crank, which engages in a slot 184 in said rack. To guide the rear end of said rack so that it moves parallel to itself, the bell-crank 182 is connected by a link 185 to a second bell-crank 186, loosely mounted on the rock-shaft 172; the loosely mounted bell-crank 186 having also a headed stud 187 engaging in a slot 188 formed in the rear end of the driving rack 104. After the rack has been raised into effective relation with its associated pinion 106 (Figure 18), everything is in readiness to permit the indexed number to be transmitted to the master wheel 83 (Figure 20), as hereinbefore described, and consequently to the dial wheel 81.

In order that the rack may be restored to its normal position (Figure 1), after a valuating operation (Figure 20), it is first lowered out of engagement with the pinion 106. For this purpose, there is provided a rack-lowering cam 190, secured to the power-shaft, which engages with a roller 191 on the bell-crank 163, to swing the latter in a clockwise direction, and by means of the intermediate mechanism (hereinbefore described), connected thereto, swings the rack-carrying bell-cranks 182 and 186 in counterclocking directions, to lower the driving rack 104 out of driving relation with the pinion 106.

To restore the driving rack, after it is disengaged from the pinion 106, there is provided a spring 192 connected between the valuating shaft 94 and an arm 193 loosely mounted on the valuating shaft (Figures 4 and 22). The arm 193 has a roller 194 which constantly bears against the periphery of a cam member 195 secured to the power-shaft 86 near the right-hand side thereof. The cam 195 normally occupies the position shown in Figure 22, where the roller 194 rests on a dwell 196 of said cam member.

During the first part of the rotative movement of the power-shaft 86, the roller 194 rides on the dwell 196, until the driving rack 104 has been rendered effective and until the computer-truck 77 has been locked by suitable mechanism, presently to be described. The roller 194 then rides down an incline 197 of the cam member 195. The indexing operation may take place between the time when the power-shaft starts rotating and when the roller 194 reaches that part of the incline 197 nearest to the shaft 86. It will be understood that the roller 194 is caused to ride down said incline 197 by the spring 192, which swings the arm 193 out of engagement with the arm 95; engagement being made between said arms 95 and 193 by a set screw 198, on the arm 95, adapted to bear against a projection 200 of the arm 193 (Figure 22).

It will further be understood that the valuating shaft 94 is locked against actuation when the roller 194 is on the dwell 196. When the roller 194 has reached the lower part of the incline 197, however, the valuating shaft 94 is free to be rocked, through an angular distance corresponding in value to the actuated number key, by means of the associated valuating cam 92, as hereinbefore described. The rack 104 is then lowered by the cam 190, as previously described, and returned to its normal position (Figure 22), by the spring 192, when the roller 194 again rides up on the dwell 196, thus again locking the valuating shaft against actuation until the power-shaft 86 is again released.

Thus it will be understood that the spring 192 forms a yielding connection in the train of mechanism extending between the driving rack 104 and the cam member 195; and that by the constant bearing of the roller 194 on the periphery of the cam member 195, noise is eliminated and a sudden shock avoided, which would be the result if the roller 194 were adapted to leave the cam member 195 and then re-engage it. It should be further understood that the spring 192 is effective to restore the train of mechanism connected to the arm 95, and that the projection 200 may engage with the set screw 198 on the arm 95 to assure the restoration of the train of mechanism, connected to the arm 95, in case the spring 192 should fail, due to a possible sticking of some of the parts.

It is desirable to lock the computer-carriage 77, so as to maintain the engaging relation between the master wheel 83 and the computing wheel 82, while a number is being transferred to the dial wheel 81 of the totalizer 76. This may be done by means of a carriage or truck-lock-pawl 201 secured to a rock-shaft 202 (Figures 1, 18 and 19), arranged near the upper and forward part of the machine, said pawl normally occupying a position, shown in Figures 1 and 19; the pawl being adapted to be swung into effective relation with suitable teeth of a rack 203 (Figure 18), formed on said computer-carriage 77.

To render the carriage-lock 201 effective, or, in other words, swing it into engagement with the rack 203 of the computer-carriage, there is rigidly secured to the power-shaft 86 a carriage-lock cam 204, which, as the power-shaft rotates, engages with a bell-crank 205 through the intermediary of a roller 206, secured thereto, to rock said bell-crank about the supporting rod 164, upon which the rack-actuating bell-crank 163 is pivotally mounted. The bell-crank 205 is thus effective to draw forwardly on a link 207 to rock a bell-crank 208 about its fulcrum 98 at the front of the machine, and pull downwardly on a link 210, which is forked at its upper end 211, so that it may be guided by the rock-shaft 202. The link or actuating member 210 is provided with a cam slot 212, into which projects a pin 213 on an arm 214, so that the latter may be actuated by said cam slot 212, to swing the rock-shaft 202, to which the arm 214 is secured, in a clockwise direction to move the pawl 201 into engagement with the rack 203, and consequently lock the computer-carriage or truck 77.

To relieve the power-shaft of any possible back pressure that may be caused by the engagement of the locking pawl 201 with the computer-carriage during a locking operation, there is provided at the upper end of the cam slot 212 a dwell 215 upon which the pin 213 rests (Figure 16). It will be seen that when the parts accupy this position, the truck-lock-shaft 202 is locked by the link 210.

A carriage-lock-releasing-cam 216 is secured to the power-shaft 86, which engages with a roller 217, secured to an arm 218 of the bell-crank 205, to positively restore the truck-lock 201 and the intermediate mechanism to normal position, after the driving rack 104 has been lowered.

It will be seen that when the power-shaft 86 is released, the pawl 90 is swung about its pivot 130 and away from a stop 220 against which it normally rests (Figure 2). When the pawl 90 has moved clear of the dog 91 on the power-shaft, a tail 221 on the actuating member 125 is engaged by a downwardly-projecting finger 222 on said pawl 90, to move the member 125 about its pivotal connection 223, on the bell-crank 124, in a counterclockwise direction to take the tooth 127 out of engagement with the tooth 128 on said pawl, thus setting the pawl 90 free of the actuating link 125 and permitting the pawl to be restored to its normal position by the spring 126. To insure that the pawl 90 get back into the path of the dog 91, so as to be ready to arrest the latter when the movement of the power-shaft is completed, there is secured to the power-shaft 86 a cam 224, which may engage with a tail 225 (Figure 17) of the pawl 90, to move the latter into the path of the dog 91. It should be understood that, under ordinary conditions, the spring 126 brings the pawl 90 back into the path of the dog 91, but in case the action of the pawl should be sluggish, the cam 224 is effective to drive it home to its normal position.

To absorb the shock at the end of the stroke of the power-shaft, when the dog 91 re-engages the holding pawl 90, and also to reduce the noise caused thereby, to a minimum, there is provided a spring 226, one end of which is connected to a collar 227, secured to the power-shaft 86 (Figures 2, 4 and 5), the other end being connected to a pin 228, extending from the dog 91; the spring 226 being effective to urge the pawl 90 in a counterclockwise direction about the shaft 86 and hold it in the lower end of a slot 230 in the cam 132 on the power-shaft. It should be understood that the dog 91 is pivotally mounted on the power-shaft 86, and that with the above-described construction, the power-shaft may overthrow slightly after the dog 91 re-engages the holding pawl 90; the pin 228, at this time, may occupy a position in the upper part of the slot 230. After the shock has been absorbed, the power-shaft 86 may return slightly until the pin 228 again rests in the bottom of the slot 230.

To facilitate quick and accurate assembling of the various elements 190, 162, 131, 216, 204, 92, 227, 132, 224 and 195, from left to right (Figure 5), on the power-shaft 86, so that they may be placed in proper relation thereon without any adjustment, the power-shaft has therein a kerf 231, adapted to receive projections 232 on the various elements, as shown on the valuating cams 92, Figures 5, 13 and 14. The various elements are held properly spaced from each other by the sleeves or collars 157, which are of various lengths. The ends of the valuating shaft 86 are threaded to receive nuts 234 between which the various elements and the collars 157 on the shaft may be bound tightly together, said nuts permitting also of an adjustment of the various elements as a whole, lengthwise of the shaft.

The dog 91, as previously stated, is loosely mounted on the power-shaft 86, and, for this purpose, it is supported on a hub 235 (Figure 5), formed on one of the sleeves 157; the hub 235 being a trifle longer than the thickness of the dog 91, so as to avoid binding the dog tight on the shaft when the nuts 234 are tightened.

The power-shaft is supported (Figure 5) in a frame comprising two side plates 236, 237, secured to a front cross-bar 238 and a rear cross-bar 240 (Figures 1, 4, 5 and 13); the cross-bars 238 and 240 being secured to a base frame 241 (Figure 1), upon which the main frame 100 of the typewriter is also secured. The power-shaft is pivotally mounted on bearing pins 242 (Figure 5), secured in the side plates 236 and 237; each pin having a reduced portion 243 which enters a hole 244 in the end of the shaft 86. The bearing pins 242 are secured in place on the plates 236 and 237 by screws 245 which are threaded into the pins 242 to expand them within holes 246; the pins being split at 247 for this purpose.

The three-armed members 112 (Figures 4 and 13), which are actuated by the number keys 30 to actuate the motor-release-shaft, are pivotally mounted on the rod 113, which extends between and is suitably supported by a bridge 248 near the left-hand end plate 236 and a bridge 250 near the right-hand end plate 237; said bridges extending between and being secured to the bars 238 and 240. The three-armed members 112 are provided with hubs 251, which separate them from each other and hold them in their proper positions on their supporting rod 113.

The forked members 122 (Figures 4 and 13), and the bell-crank or motor-release-arm 124 are provided with projections 252 engaging in a slot 253 in the shaft 123, and are secured to said shaft between collars 254 by nuts 255 at the ends of said motor-release-shaft 123.

The motor-release-shaft is located between the right-hand end plate 237 and the bridge 248, and is pivotally supported on bearing pins 256, which may be similar in construction to the pins 242.

A guide-bar 257 (Figures 4 and 13) is secured to the bridges 248 and 250, and is provided with slots 258, in which the upper ends of the cam slides 117 are guided; the bar 257 serving as a backing for each slide when the stop 147 thereon is engaged by the set screw 148 (Figure 14). The bar 137 upon which the members 135 are pivotally mounted is also secured to the bridges or plates 248 and 250.

The master wheel 83 is normally locked against actuation, and is held in alignment with the teeth of the computing wheels 82, so that the latter may readily mesh therewith, by a holding tooth $259^a$ (Figure 18) on a lever 259, pivoted at 260; the tooth engaging between the teeth of the master wheel. The lever 259 is adapted to be swung about its pivot, to release the master wheel, by means of an arm 261 secured to the rock-shaft 202, to which the carriage-lock 201 is also secured, and which is rocked by the cams 204 and 216 on the power-shaft 86, as hereinbefore described. The cams 204 and 216 are so timed relatively to the cams 162 and 190, which raise and lower the driving rack 104 into and out of engagement with the pinion 106, that the driving rack is in meshing relation with said pinion before the holding tooth $259^a$ is moved out of engagement with the master wheel 83; and that upon the restoration of the parts to their normal positions, the holding tooth $259^a$ engages the master wheel before the driving rack 104 is lowered out of engagement with the pinion 106. From this it will be understood that accidental displacement of the train of gearing between and including the master wheel 83 and the pinion 106 is prevented.

The tens-carry-over mechanism may be like that shown and described in the application of Gustave O. Degener, herein referred to, and a description of which is thought unnecessary in the present case.

In order that the touch required to actuate the number keys in order to print therewith may be the same as is required for the alphabet keys, provision is made in the connections extending between the number keys and the actuating mechanism including the three-armed members 112, so that the actuating mechanism is ineffective to pull up the type-bars 37 to cause them to print against the platen 40. This may be done by providing yielding connections, comprising springs 262 (Figures 1, 10 and 13) between the links 116 and the three-armed members 112; one end of each spring 262 being connected to a pin 263 projecting from an adjustable member 264, rigidly secured to the link 116, by means of a screw 265; the other end of the spring 262 being connected to a pin 266 on an arm 267 of the three-armed member 112. The pin 266 is normally held in the end of a slot 268 formed in the member 264, which may be moved lengthwise of the link 116, in order to adjust its length, and may be secured in place by the screw 265. To assist in holding the member 264 on the link 116, it is provided with fingers 270, which partly surround the end of the link 116. Thus, it will be seen that when the power-shaft 86 is released by one of the number keys, the key becomes connected to the motor-release-shaft 123, by the three-armed member 112, the latter being then actuated by the shaft 123. This movement of the three-armed member 112, in addition to performing the indexing operation, previously described, pulls on the link 116 through the spring 262 to swing the type-bar 37 towards the platen. When the heel 46 of the type-bar engages the universal bar 44, the force thereof is counteracted by the universal bar-return-spring 59, and is consequently arrested before the type reaches the platen, assuming that the operative has actuated the number key with a lighter touch than that required for the alphabet keys 31. When the type-bar has been arrested by the universal bar, the movement of the three-armed member 112 is continued to complete its stroke, during which time the connecting spring 262 yields. Obviously, in the depression of a numeral key, the resistance arising from actuating the motor-releasing mechanism must be overcome, and then the depression of the key is assisted due to the tensioning of the corresponding spring 262. In order, therefore, to obtain the desired result, namely, of having the touch, necessary for printing, substantially the same for both alphabet and numeral keys, it is necessary to have springs 262 of sufficient strength to compensate for the resistance incurred in the earlier part of a numeral key-stroke. From the foregoing, it will be understood that, in order to print the computed number, and feed the carriage 41, the number keys may be actuated with the same touch required for the alphabet keys, and that a lighter touch may start said computing mechanism without printing.

In the Underwood machine, the momentum of an actuated type-bar is depended upon to effect printing by the types thereon on a sheet of paper carried by the platen. A numeral key may, therefore, be depressed to start the computing mechanism and to actuate the escapement mechanism without printing. The operative may, therefore, determine, merely by the manner of actuating the numeral keys, whether computation is to be accompanied by printing.

In the Underwood machine, the key-levers 32 flex slightly, so that they have a kind of cushion effect to the touch of the operative; this being due to the fact that the key-levers project considerably beyond their points of connection 271 with the bell-cranks 35. In order to maintain this advantageous feature, the bell-cranks 113$^a$ are connected to the key-levers in back of the points of connection 271, or, in other words, between the latter and the fulcrum 33 of the key-lever.

It is preferable to have the bell-cranks 113$^a$ positively connected to the key-levers 32, so that the key-lever-return-spring 34 may serve to return the connections extending to the actuating mechanism, and assist the spring 126, connected to the pawl 90 and the actuating link 125, in returning the motor-release-shaft 123.

In reference to the computing mechanism, it should be understood that the number keys 30 are effective only to release the power-shaft 86, as described, and that the cam slides 117 move idly downward until after the power-shaft is released, a dwell 272 (Figure 10) in the cam slot 140 of said slide being provided for this purpose. The instant the power-shaft is released, however, the cam 140 is in a position to engage with the pin 138 on the pivoted intermediate member to swing the latter about its pivot 136, and thus shift the corresponding interponent 93 into effective relation with the valuating cam 92, as hereinbefore described. The upper end of said cam slot is also provided with a dwell 273 wherein the pin engages to hold the interponent against lateral displacement while it is in effective relation with the valuating cam.

The escapement mechanism, including the dog-rocker 50, is actuated, as hereinbefore described, during the latter part of the upward movement of the type-bar 37 when the heel 46 engages with the universal bar 44. With this construction, it may be possible to again print and actuate the escapement mechanism before the actuating link 125 has re-engaged the pawl 90, which controls the power-shaft 86. This would result in repeated printing of the same number and feeding of the carriage 41 without effecting repeated computations.

To avoid any possibility of repeated printing and feeding of the typewriter carriage without computing, there is provided a locking means or a holding means, which may be rendered effective during the initial part of the movement of any one of the number keys, so as to be ready to lock the dog-rocker in its actuated position, and thus hold the carriage against feeding movement until the number key has been returned sufficiently to permit the power-shaft-releasing devices to re-engage.

The holding or locking means, for the carriage 41, may comprise a pawl 274 (Figures 1, 4, 16 and 17), pivoted at 275 on a bracket 276, secured to the bridge 250. The locking pawl 274 is adapted to be moved in a counterclockwise direction by a suitable spring 277, but is held in ineffective position (Figure 1), by a controlling member 278, pivoted at 280, which is connected by means of a link 281 to an arm 282 of the bell-crank member 124 on the motor-release-shaft 123, so that the controlling member 278 may be swung away from the locking pawl 274 when the motor-release-shaft is actuated by the depression of a number key 30, as hereinbefore described, thus permitting the locking pawl 274 to be rendered effective as in Figure 16, where it rests against the periphery of a co-operating member 283. This happens during the early part of the actuation of the number key. A further depression of the key to the position shown in Figure 17 causes the universal bar 44 to be actuated, thus swinging the carrying frame 47 about its pivot including the rock-shaft 48. A downwardly-projecting arm 284 on the rock-shaft 48 moves therewith in a clockwise direction, and engages, by means of a pin-and-slot connection 285, to actuate an arm 286 and rock a shaft 287, to which said arm is secured. The rock-shaft 287 has secured thereto and near the right-hand side thereof an upwardly-projecting arm 288, which pulls forwardly on a link 290 to swing the co-operating member 283 about its pivot 291 in a counterclockwise direction; the locking pawl 274 dropping into a notch 292 of the member 283, Figure 17, to hold it, and consequently the dog-rocker 50 in its actuated position; the escapement wheel being at this time held by the fixed dog 55 of said dog-rocker. A spring 289 is connected to the link 281 and the bracket 276 to return the link 281 and the connected parts.

The parts are so timed that the locking pawl 274 becomes released when the parts have resumed a position from which the motor may again be released. To insure this condition, the tooth 127 on the actuating link 125, connected to the motor-release-shaft 123, moves into effective relation with the tooth 128 on the holding pawl 90, immediately prior to the withdrawal of the locking pawl 274 from the notch 292, by the return movement of the controlling member 278, or, in other words, the releasing of the dog-rocker 50.

The co-operating member 283 comprises an arm 293 (Figure 16), and is adjustable relatively to said arm, and is held in place thereon by a screw 294, which passes through a slot 295, in said co-operating member. In a similar way, the controlling member 278 comprises an arm 296 and a screw 297, for the purpose of adjustment, this adjustment being provided so that the locking pawl 274 may be rendered ineffective at the proper time.

Means is provided to prevent any possibility of repeated computation in the same letter-space position, which could otherwise be effected by permitting the parts to come back to a position where the holding pawl 90 is re-engaged, and again operating the number keys 30 before the dog-rocker and consequently the carriage are released from the locking means including the pawl 274. This would permit the power-shaft to again become released to effect another computation while the carriage is in the same letter-space position. This means may be in the form of a full-stroke device 297 (Figure 1) for the keys 30, to compel the complete restoration of the keys before they can again be actuated. The full-stroke device may be like that disclosed in my prior application, No. 81,574.

For the sake of clearness, the full-stroke device will first be described in connection with the down stroke of the number key 30. It is essential that the full-stroke device 297 be effective on the down stroke of the number key, as shown in Figure 1, so as to compel a complete depression of the key, or, in other words, a complete positive actuation of the printing device, comprising the key 30 and the connected type-bar 37, and consequently cause the type-bar to print against the platen, thereby preventing any possibility of actuating the number key 30 to an extent which would release the power-shaft 86 and cause a computation without printing. Each number key has pivotally mounted thereon a pendant 298 (Figures 1 and 9), the lower end of which is guided in a suitable plate 300. Each pendant 298 is provided with a series of teeth 301, with which a pawl 302 is adapted to engage during the depression of the number key 30, to prevent the return of said key until the pawl 302 is moved out of engaging relation with the teeth 301, which occurs at the extreme end of the downward movement of the number key 30.

The moving of the pawl 302 out of engagement with the teeth 301 is caused by a controlling member 303, in the form of a bell-crank (Figure 8), pivotally mounted at 304 on the dog-rocker 50. It will be remembered, as the type-bar approaches the printing point, the universal bar 44 is moved rearwardly to actuate the dog-rocker 50 to move the loose dog 52 out of engagement, and the fixed dog into engagement, with the tooth 53 on the escapement wheel 54; the loose dog being at this time swung about its pivot by the spring 57. This movement of the loose dog permits the controlling member 303, one arm 305 of which is normally held between the loose dog 52 and the stop 62 therefor, to be swung about its pivot 304, by means of a spring 306 which is effective to swing a bell-crank 307, to which it is connected, and pull downwardly on a link 308, connected to said controlling member 303, to cause the arm 305 to follow the loose dog 52. Said bell-crank is yieldingly connected, by means of a spring 310, to a link 311, and is effective to pull on said link and rock a shaft 312, upon which the pawls 302 are mounted, in a clockwise direction, through the intermediary of an arm 313, which is connected to said shaft by means of a pin 314 (Figure 9), extending from said rock-shaft and into a slot 315 in a hub 316 of said arm 313. Thus the pawls 302 are swung out of effective relation with teeth 301 on the pendants 298. When the pawls 302 are rendered ineffective, however, other pawls 317 are moved into effective relation with a second series of teeth 318 on pendants 298, to engage during the return stroke of a key 30, and prevent a repeated depression of a key until it has been fully restored to its normal position, thereby preventing any possibility of repeated computation in the same letter-space position; this being due to the fact that the releasing means for the power-shaft becomes again effective, and the holding pawl 274 is released, before the full-stroke device 297 is rendered ineffective for the return stroke of the key 30, or, in other words, before the complete negative actuation of the printing device. It will be understood that pawls 302 are again rendered effective when the pawls 317 are rendered ineffective, and that this is done during the return movement of the dog-rocker when the loose dog is swung back to its normal position (Figure 8), the controlling member 303 being at this time swung about its pivot 304 to actuate the connected parts including the pawls 302 and 317.

To provide flexibility for the pawls 302, so that they may yield to snap over the teeth 301, there is provided a spring 319 (Figure 9), one end of which is connected to the shaft 312, the other end being secured to the hub 316 of the arm 313. The pin 314, during such movements of the pawls 302, moves idly up in the slot 315 in said hub. Flexibility for the pawls 317 on the up stroke of the key is had in the spring 310.

It is sometimes desirable to render the computing mechanism ineffective, so that the numbers may be typed without computing them. For this purpose, there is provided a non-compute key 320, which may be swung forwardly, from the position shown in Figure 1 to the position shown in Figure 15, about a pivot 321, to pull forwardly a link 322 connected thereto and swing a lever 323, pivotally mounted at 324 on the shift-frame 67; said lever having connected at its lower end a rearwardly-extending link 325 to actuate a bell-crank member 326, loosely mounted on the motor-release-shaft 123. The bell-crank member 326 has an arm 327 which engages with a pin 328 on the actuating arm 125, to swing the latter about its pivot 223, and take the tooth 127 thereon out of effective relation with the co-operative tooth 128 on the holding pawl 90. If the number keys are now actuated, they will be ineffective to release the power-shaft, and consequently the numbers may be type without effecting computation thereof. The bell-crank member 326 is mounted between two of the collars 254 on a reduced portion 330 (Figure 15) on one of said collars; said reduced portion being a trifle longer than the thickness of the bell-crank member 326, so as to avoid binding of said bell-crank when the nuts 255 are tightened on the motor-release-shaft 123.

The upper-case types 63 on the number type-bars are usually characters other than numbers. It is therefore desirable to render the computing mechanism ineffective when the platen is shifted to upper-case position. For this purpose, the lever 323 rests against a pin 331 on the shift-frame 67, so that upon the actuation of the shift-frame, the lever is moved therewith to pull forwardly the link 325 to swing the bell-crank 326 and render the actuating lever 125 ineffective (Figure 15). The lever 323, when actuated by the non-compute key 320, swings relatively to the shift-frame 67, and is, for this purpose, provided with a slot 332, so that it may move away from the pin 331. When the lever 323 is actuated with the shift-frame 67, a pin 333 thereon, to which the link 322 is connected, moves idly forward in a slot 334 in said link, thus leaving the non-compute key undisturbed. A return spring 335 is provided for the lever 323. The non-compute key 320 may be retained in its actuated position by any suitable form of detent.

It will be seen (Figure 4) that the machine is so designed that more units, comprising the link 116, member 112, cam slide 117, interponent 93, valuating cam 92 and forked member 122, may be assembled thereon, when it is desired to equip the machine for computing pence of English money. When the machine is so equipped, the collar 227 is replaced by the last valuating cam 92 and the spring 226 is connected thereto.

The electric motor 88 may be supported by two brackets 336 (Figures 1, 3 and 5), mounted on a frame comprising a front bar 337 and a rear bar 338 extending crosswise of the machine, said bars being secured to a left-hand end plate 340 and to a right-hand end plate 341, conveniently mounted on the end plates 236 and 237, hereinbefore referred to.

The motor 88 is connected in an electric circuit comprising two conductors 342 and 343, connected to any suitable source of electrical current. The conductor 343 may comprise two sections connected to terminals 344 and 345 between which a switch 346 may engage; said switch may be of the well-known snap switch type, and be automatically controlled by means, hereinafter described, to close and open the switch to start and stop the motor 88.

The motor, when in action, runs at a comparatively high speed, and comprises a shaft 347 which rotates in a clockwise direction, as indicated by arrows at Figures 1 and 5. To transfer the energy of the electric motor or primary motor 88 to the spring motor or secondary motor 87, the motor shaft 347 is adapted to drive a pinion 348 through the intermediary of a helical spring 350; said spring being frictionally sprung over a sleeve 351, detachably mounted on the motor-shaft 347, by means of a pin-and-slot connection 352; the other end of said spring being sprung over a hub 353, on the pinion 348, mounted to rotate on a stud 354 projecting from the side plate 340. The spring 350, in addition to facilitating a slightly yielding connection between the motor-shaft 347 and the pinion 348, eliminates the necessity of the axis of said pinion being in alignment with the axis of the motor-shaft.

To reduce the speed, the connection from the electric motor 88 to the spring-motor may comprise a large gear-wheel 355 driven by the pinion 348 and supported on a stud 356 secured to the side plate 340. A pinion 357 secured to the side of the gear-wheel 355 rotates with the latter in a counterclockwise direction and meshes with a gear-wheel 358, secured to a shaft 360 to rotate the latter and a barrel pinion 361, through the intermediary of a helical spring 362, in a clockwise direction. The spring 362 is connected to the shaft 360 by being sprung over a hub 363 of a collar 364, fastened to said shaft by a screw 365, the other end of the spring 362 being connected to the barrel pinion 361 in a similar manner by being sprung over a hub 366 thereon. The windings of the spring 362, as well as those of the spring 350, are in such a direction that the end windings have a tendency to take a tighter hold on the hubs 363 and 366 while the shaft 360 is being rotated. The barrel pinion 361 is rotated in a clockwise direction and meshes to rotate a gear-wheel 367, on a rod 368, in a counterclockwise direction; the latter being connected to one end of, and adapted to wind, a helical spring 369 (Figure 5), contained within a suitable barrel or casing 370. The spring 369 has four long coils, contained within each other, which extend substantially from the right-hand side to the left-hand side of the barrel 370, the two inner coils being connected to each other at their left-hand ends by the end windings which merge into each other, the second and third coils being connected in the same way at their right-hand ends, and the third and fourth, or outer, coils at their left-hand ends. It will be understood that the coils, since they are joined at their ends, form the equivalent of a long helical spring. The right-hand end 371 of the outer coil of the spring 369 is connected to the casing 370 through the intermediary of a ring 372, secured to said casing by means of one or more screws 373; the ring 372 fitting over a hub 374 on the gear-wheel 367, to form a bearing for said drum. It will be seen that the spring 369 is adapted to be wound in a counterclockwise direction; consequently there is a tendency for the end 371 of said spring to rotate the drum 370 in the same direction. The drum 370 has at its left-hand end a gear-wheel 375 secured thereto by means of one or more screws 376. The gear-wheel 375 is adapted to rotate a pinion 377 and a shaft 378, suitably supported between the end plate 236 and the bridge 248, in a clockwise direction. The pinion 377 has secured thereto a gear-wheel 379 which is adapted to mesh with the pinion 131 secured to the power-shaft 86 to drive the latter in a counterclockwise direction through a complete revolution at each actuation of the holding pawl 90, which is actuated or tripped to release the power-shaft at each operation of a number key 30, to permit the various cams on the power-shaft to perform their functions, as hereinbefore described.

The shaft 360 is rotatably supported between the right-hand end plate 341 and a bracket 380 (Figure 3), secured near the left-hand end of the cross-bar 338; the shaft 360 being so supported at its left-hand end to avoid interference with the gear wheel 355.

From the foregoing, it will be understood that the spring motor 87 is provided with spring means comprising the helical springs 362 and 369; and that when the energy is being transferred from the electric motor 88 to the spring-motor 87, the drum or casing 370, to which the end 371 of the spring 369 is connected, is held against rotation by being connected to the power-shaft 86 which is held by the pawl 90. It will further be understood that the energy is stored in both helical springs, the forces in both springs being adapted to balance each other through the intermediary of the connection between them, comprising the pinion 361 and the gear-wheel 367. During an energy-storing operation, the shaft 360 is rotated and some of the energy is stored in the helical spring 362, the spring being also effective to rotate the pinion and transfer energy to the helical spring within the casing, the forces of said springs constantly balancing each other. It will further be seen that since some of the energy is stored in the spring 362, the barrel pinion rotates at a slightly slower rate of speed than the shaft upon which it is mounted. This difference in speed is effective to cause the pinion 361 to travel lengthwise of a screw 381, formed on the end of the shaft 360, to open and close the switch 346 of the electric motor, so that it may be automatically opened to stop the electric motor after the desired amount of energy has been stored in the spring-motor.

To open the switch 346 for the electric motor, when sufficient energy has been stored in the spring-motor 87, the switch may comprise a pivoted lever 382, connected by a link 383 to a lever 384, pivoted at 385 on the cross-bar 338. The lever 384 is connected to said barrel pinion 361, by a stud 386, projecting downwardly into an annular groove 387 of the barrel pinion, to swing the lever 384 about its pivot when said barrel pinion 361 moves lengthwise of the shaft 360, as above described, and toward the right-hand side of the machine; the pinion, for this purpose, having internal threads 388 at its right-hand end (Figure 5). This rightward movement of the barrel pinion on the screw 381 continues until the switch is suddenly snapped to actuate the pivoted lever 382, to open the circuit and stop the electric motor. The helical spring has a tendency to expand lengthwise of the shaft, and consequently it follows up the pinion 361 when the latter is moved rightwardly on the screw 381.

As the spring-motor runs down by driving the power-shaft 86, the energy-receiving end thereof, comprising the gear 358, is held by a check device 390, hereinafter described, and the forces in the two helical springs again keep balancing each other. This balancing effect of the springs causes the pinion 361 to be rotated in a clockwise direction, and, as the shaft 360 is held by the check device 390, the barrel pinion is fed along the screw in a leftward direction, and swings the lever 384 until almost all of the energy has been given off from the spring-motor, when suddenly the switch again snaps, but this time to close the circuit to start the electric motor. It will be understood that this starting and stopping of the electric motor and the storing of energy in the spring-motor repeats itself automatically and is accomplished without any attention on the part of the operative.

To prevent the stored energy from being given off at the receiving end of the spring-motor 87, which would result in reversely rotating the electric motor 88, there is provided the check device 390, Figures 6 and 7, which may be in the form of a pinion, adapted to mesh with the pinion 357 and gear-wheel 358. The pinion is normally in interlocking relation with the pinion 357 and the gear-wheel 358. When, however, the gear-wheel 358 is rotated by the pinion 357, the check pinion 390 moves bodily out of mesh with the pinion 357 and is swung about the axis of the gear-wheel 358, by the action of said gear-wheel; the pinion 390 being rotatively supported for this purpose on a lever 391, pivotally mounted on the shaft 360. The lever 391 may be arrested in its swinging movement by a suitable stop 392 engaging the cross-bar 338 (Figure 6). As soon as the driving effect of the pinion 357 on the gear-wheel 358 has ceased, however, the check pinion 390 drops back into interlocking relation with the pinion 357 and gear-wheel 358 (Figure 7), thus preventing any backing up of the spring-motor.

The drum 370 may be held in place on the rod 368 by two collars 393 (Figure 5), secured to said rod by set screws 394; the rod being suitably supported in the end plates 340 and 341.

If at any time the power-shaft should stick or become blocked, it is desirable to restore the same to its normal position. To do this, there is provided a finger-wheel 395 (Figures 5 and 12), on a short shaft 396, rotatively supported on the left-hand end plate 236; said shaft having thereon a pinion 397 at the inside of said plate 236. The pinion 397 meshes with a pinion 398 on the shaft 378, so that the power-shaft 86 may be reversely rotated through the intermediary of the gear-wheel 379 by the rotation of said finger-wheel 395, and thus restore the power-shaft to permit the holding pawl 90 to snap under the dog 91.

To facilitate the assembling of the various parts of the machine, it will be seen that the motor-set, comprising the spring-motor 87 and the electric motor 88, is carried by the frame comprising the end plates 340 and 341 and the cross-bars 337 and 338, so that it may be assembled as a separate unit; further that the actuating mechanism including the power-shaft 86 is carried by the frame comprising the end plates 236 and 237 and the cross-bars 238 and 240, and may also be assembled as a separate unit; and that the two frames, after the various parts carried thereby are assembled thereon, may be mounted one upon the other and secured to each other by screws including the screws 400 (Figure 1), the only connection between the parts carried by the two frames being between the gear-wheel 375 of the spring-motor and the pinion 377 geared to the valuating shaft. It will further be seen that the two frames, after they are attached to each other, may be considered as a principal unit which may be attached to the base frame 241 by screws 401 (Figure 1).

The typewriter including the frame 100 may also be considered as a principal unit, which, after the various parts carried thereby have been assembled thereon, may also be secured to the base frame 241. After the two principal units have been attached to the base frame 241, the various connections between the co-operating parts of both principal units may be made. Although simple connections are shown in the drawings, for the sake of clearness, any convenient form of connections, which permit both of adjustment and convenient assemblage, may be used.

Variations may be resorted to within the scope of the invention, and portions of the improvements may be used without others.

Having thus described my invention, I claim:

1. In a combined typewriting and computing machine, the combination of a driving shaft, a driven shaft, a series of computing units through the medium of which the driven shaft may be rocked through different angular distances to compute values from one to nine, inclusive, each computing unit comprising a cam on the driving shaft, adapted to co-operate with an arm on the driven shaft, and a stop to limit the movement of said driven shaft, a series of actuating elements, one for each computing unit, devices connected to said actuating elements, said stops being of various lengths and forming parts of said devices, co-operating members on said driven shaft to co-operate with said stops, and adjusting screws to facilitate individual adjustments between said devices and said stops.

2. In a combined typewriting and computing machine, the combination of a driving shaft, a driven shaft, a series of computing units through the medium of which the driven shaft may be rocked through different angular distances to compute values from one to nine, inclusive, each computing unit comprising a cam on the driving shaft, adapted to co-operate with an arm on the driven shaft, and a stop to limit the movement of said driven shaft, a series of actuating elements, one for each computing unit, slides connected to said actuating elements, a bar to guide said slides, said stops being in the form of studs of various lengths formed on said slides, standards on said driven shaft, and adjusting screws on said standards to co-operate with said stops, said bar serving as a backing for the slides when their stops are engaged by the set screws.

3. In a combined typewriting and computing machine, the combination of a driving shaft, a driven shaft, a series of computing units through the medium of which the driven shaft may be rocked through different angular distances to compute values from one to nine, inclusive, each computing unit comprising a valuating cam on the driving shaft, an interponent on the driven shaft, and a stop to limit the movement of said driven shaft, a series of actuating elements, one for each computing unit, devices connected to said actuating elements, said stops being of various lengths and forming parts of said devices, co-operating members on said driven shaft to co-operate with said stops, adjusting screws on said co-operating members to facilitate individual adjustments between said co-operating members and said stops, and adjusting screws on said interponents to facilitate adjustments thereof relatively to the driven shaft, said last-mentioned screws being adapted to bear against said co-operating members.

4. In a combined typewriting and computing machine, the combination of computing mechanism comprising a variably movable element, valuating members to actuate said element, a spring to restore said element, and a device to insure the full restoration of said element.

5. In a combined typewriting and computing machine, the combination of computing mechanism comprising a master wheel and a variably movable element, means, including valuating cams, to actuate said element, a master-wheel-driving member connected to said element, a spring to restore said element, and means, including a cam to insure the full restoration of said element and the driving member.

6. In a combined typewriting and computing machine, the combination of computing mechanism comprising a variably movable element, a normally held driving shaft, means, including valuating cams on said shaft, to actuate said element, a key-actuated means to release said shaft, a spring to restore said element, and means, including a cam to insure the full restoration of said element.

7. In a combined typewriting and computing machine, the combination of computing mechanism comprising a master wheel and a variably movable element, means, including valuating cams, to actuate said element, a master-wheel-driving member connected to said element, a spring to restore said element, an arm pivoted on said element, a projection on said element, and a cam to actuate said arm and cause it to engage with said projection, to insure the full restoration of said element and the driving member.

8. In a combined typewriting and computing machine, the combination of computing mechanism comprising a valuating shaft, a driving shaft, means, including valuating devices on said driving shaft, to actuate said valuating shaft, a cam on said driving shaft, a pivoted arm on said valuating shaft, and a spring, said arm being constantly held against the periphery of said cam by said spring, the latter being connected between the valuating shaft and the arm thereon and effective to restore said valuating shaft, said cam being effective to insure the full restoration of said valuating shaft.

9. In a combined typewriting and computing machine, the combination of computing mechanism comprising a master wheel and a valuating shaft, a driving shaft, means, including valuating devices on said driving shaft, to actuate said valuating shaft, an arm rigidly secured to said valuating shaft, means comprising a driver for the master wheel connected to said arm, a cam on said driving shaft, pivoted arm on said valuating shaft, a spring, said pivoted arm being constantly held against the periphery of said cam by said spring, the latter being connected between the valuating shaft and the pivoted arm thereon and effective to restore said valuating shaft, and a projection on said valuating shaft, said cam being effective to cause said pivoted arm to engage with said projection to insure the full restoration of said valuating shaft and the driver for the master wheel.

10. In a combined typewriting and computing machine, the combination with computing mechanism and number keys, of driving means to actuate said computing mechanism, a holding pawl for said driving means. key-controlled means to actuate said holding pawl to release said driving means, and means on said holding pawl to release the latter from said key-controlled means after the driving means has been released.

11. In a combined typewriting and computing machine, the combination with computing mechanism and number keys, of driving means to actuate said computing mechanism, a holding pawl for said driving means, key-controlled means, comprising a universal member and an actuating element, to actuate said holding pawl to release said driving means, and a projection on said holding pawl to swing said actuating element out of effective relation with said holding pawl after the driving means has been released.

12. In a combined typewriting and computing machine the combination with computing mechanism and number keys, of driving means to actuate said computing mechanism, a dog on said driving means, a holding pawl for said driving means, said holding pawl co-operating with said dog, key-controlled means to actuate said holding pawl to release said driving means, means to release the holding pawl from said key-controlled means, and means controlled by said driving means to bring said holding pawl back into the path of said dog.

13. In a combined typewriting and computing machine, the combination with computing mechanism and number keys, of driving means to actuate said computing mechanism, a dog on said driving means, a holding pawl for said driving means, key-actuated means to actuate said holding pawl to release said driving means, a projection on said holding pawl to swing said key-actuated means out of effective relation with said holding pawl after the driving means has been released, and a cam on said driving means to engage with said pawl to bring it back into the path of said dog before the latter re-engages said pawl.

14. In a combined typewriting and computing machine, the combination with computing mechanism and number keys, of driving means comprising a shaft, a dog on said shaft, a pawl co-operating with said dog, key-controlled means to actuate said pawl to release said shaft, said dog being effective to arrest said shaft by re-engaging said pawl, and means to absorb the shock after said dog strikes said pawl.

15. In a combined typewriting and computing machine, the combination with computing mechanism and number keys, of driving means comprising a shaft, a dog on said shaft, a spring connection between said shaft and said dog, a pawl co-operating with said dog, and key-controlled means to actuate said pawl to release said shaft, said dog being effective to arrest said shaft by re-engaging said pawl, the spring connection being effective to absorb the shock when the dog strikes said pawl.

16. In a combined typewriting and computing machine, the combination with computing mechanism and number keys, of driving means comprising a shaft, a dog yieldingly mounted on said shaft, a pawl co-operating with said dog, key-controlled means to actuate said pawl to release said shaft, said dog being effective to arrest said shaft by re-engaging said pawl, and means to limit the extent of yielding of said pawl.

17. In a combined typewriting and computing machine, the combination with computing mechanism and number keys, of driving means comprising a shaft, a dog pivoted on said shaft, a spring connection between said shaft and said dog to permit the latter to yield relatively to said shaft, a member, having a slot therein, secured to said shaft and adjacent to said dog, a pin on said dog projecting into said slot to limit the extent of yielding of said dog, a pawl co-operating with said dog, and key-controlled means to actuate said pawl to release said shaft, said dog being effective to arrest said shaft by re-engaging said pawl, the spring connection being effective to absorb the shock when the dog strikes said pawl.

18. In a combined typewriting and computing machine, the combination of a carriage, a carriage-lock, computing mechanism, a power-shaft for actuating said computing mechanism, means whereby said power-shaft may actuate said carriage-lock, and means to relieve said power-shaft of any back pressure from said carriage-lock after the latter has been rendered effective.

19. In a combined typewriting and computing machine, the combination of a carriage, a carriage-lock, a power-shaft, an element on said power-shaft, a cam member actuated by said element, said cam member being effective to actuate said carriage-lock, and a dwell on said cam member to relieve the element on said power-shaft of any back pressure from said carriage-lock after the latter has been rendered effective.

20. In a combined typewriting and computing machine, in combination, a carriage, a holding device for said carriage, comprising a dog movable to and from effective position, a shaft on which said dog is fixed, an arm fixed on said shaft, a pin extending from said arm, and a reciprocable member having a slotted portion embracing said shaft to assist in guiding said member and a cam slot to receive said pin, said slot comprising an effective portion to move said dog to and from effective position and a dwell portion to lock said dog in effective position.

21. In a combined typewriting and computing machine, the combination of computing mechanism, driving mechanism comprising a shaft, devices including valuating devices on said shaft, said shaft having a kerf therein, all of said devices having projections thereon to fit into the kerf to facilitate the assembling of said devices relatively to each other on said shaft, and means to rigidly secure said devices on said shaft.

22. In a combined typewriting and computing machine, the combination of computing mechanism, driving mechanism comprising a shaft, devices including valuating devices on said shaft, said shaft having a kerf therein, all of said devices having projections to fit into the kerf to facilitate the assembling of said devices relatively to each other on said shaft, spacing collars between said devices, and nuts on said shaft to bind said devices and said collars together to rigidly secure them to said shaft.

23. In a combined typewriting and computing machine, the combination of printing devices, computing mechanism, and actuating means for said computing mechanism, each printing device having a connection to start said actuating means, the latter acting to yieldingly urge said printing devices to print, but being ineffective to effect printing.

24. In a combined typewriting and computing machine, the combination of number-printing devices including keys, alphabet-printing devices including keys, computing mechanism, and actuating means for said computing mechanism, each number-printing device having a connection to start said actuating means, the latter being effective to assist in actuating said number-printing devices, but ineffective to effect printing thereby without assistance, whereby the operative will be compelled to actuate the number keys, in order to print thereby, with substantially the same touch as is required to actuate the alphabet keys.

25. In a combined typewriting and computing machine, the combination of printing devices, computing mechanism, actuating means for said computing mechanism, each printing device having a connection to start said actuating means, the latter, when started, acting on said connection to urge said printing device to print, said connection being adapted to yield when actuated by said actuating means, so as to be ineffective to print, and a universal element with which any one of said printing devices may engage and be arrested thereby when acted upon by the corresponding connection.

26. In a combined typewriting and computing machine, the combination of a plurality of type-actions, computing mechanism, actuating means for said computing mechanism, each type-action having a connection to start said actuating means, said connection comprising a lever, a link and a spring connecting said link to said lever, said actuating means, when started, acting on said connection to yieldingly urge the type-action to print, and a universal element adapted to arrest the actuated type-action, in case the latter is moved thereagainst by the spring, to prevent it from printing, the actuating means being effective, however, to complete the computation.

27. In a combined typewriting and computing machine, the combination of a carriage, a plurality of type-actions, each comprising a type-bar, computing mechanism, actuating means for said computing mechanism, each type-action having a connection to start said actuating means, said connection comprising a lever, a link and a spring connecting said link to said lever, said actuating means being effective, through said connections, to yieldingly urge said type-actions to print, a universal bar with which the type-bars co-operate, carriage-escapement mechanism actuable by said universal bar, and a return spring for the latter, said return spring being of greater strength than any of the springs in said connections, whereby the operative, in order to cause a type-bar to actuate the universal bar and to print, will be compelled to actuate the corresponding type-action with substantially the normal touch, the initial resistance due to starting the actuating means being compensated for by the actuating means acting through the springs of said connections.

28. In a combined typewriting and computing machine, the combination of a carriage, printing devices, a carriage-escapement under the control of said printing devices, computing mechanism, and actuating means therefor under the control of said printing devices, so that the actuating means may be started thereby, said actuating means, after it has been started by any one of said printing devices, being effective to yieldingly urge the same to print, but ineffective to actuate said escapement without assistance, whereby actuation of the escapement and feeding of the carriage will be dependent upon the manner in which the printing devices are actuated by the operative.

29. The combination of a key-lever, printing means connected to said key-lever, actuating means, starting means for said actuating means, comprising a yielding connection, and being connected to said key-lever, and means whereby said actuating means, when rendered effective by said starting means, will act therethrough to assist in actuating said key-lever.

30. The combination of a key-lever, a fulcrum therefor, printing means connected to said key-lever, actuating means, starting means for said actuating means, said starting means being connected to said key-lever between the fulcrum thereof and the connected printing means, and means whereby said actuating means when started will act through said starting means to actuate said printing means.

31. In a combined typewriting and computing machine, the combination of number-printing devices, computing mechanism, actuating mechanism for said computing mechanism, adapted when started by a number-printing device to act through one complete cycle, and means to prevent separate impressions of the same number without effecting computations of the same.

32. In a combined typewriting and computing machine, the combination of number-printing devices, computing mechanism, actuating mechanism for said computing mechanism, adapted when started by a number-printing device to act through one complete cycle, a carriage, and means to lock said carriage to prevent separate impressions of the same number without effecting computations of the same.

33. In a combined typewriting and computing machine, the combination of number-printing devices, computing mechanism, normally held actuating means for said computing mechanism, releasing means for said actuating means, a carriage, locking means for said carriage, said locking means being rendered active by any one of said printing devices, to prevent separate impressions of the same number without effecting computations of the same, and means to release said locking means after said releasing means has again become effective.

34. In a combined typewriting and computing machine, the combination of printing devices, computing mechanism, normally held actuating means for said computing mechanism, a carriage, carriage-escapement mechanism including a dog-rocker, the latter, in its actuated position, being adapted to hold the carriage, releasing means for said actuating means, locking means to hold said dog-rocker in its actuated position, said locking means being rendered active by said releasing means, and means controlled by any one of said printing devices to cause said dog-rocker to be locked by said locking means, said locking means being adapted to be actuated to release the dog-rocker after the releasing means has again become effective.

35. In a combined typewriting and computing machine, the combination of printing devices, computing mechanism, normally held actuating means for said computing mechanism, a carriage, a carriage-escapement including a dog-rocker, the latter, in its actuated position, being adapted to hold the carriage, releasing means for said actuating means, a locking device, said locking device being under the control of said releasing means, so that when the latter is actuated the locking device may be rendered active, a universal bar for said printing devices, and means controlled by said universal bar to permit said locking device to lock said dog-rocker and hold said carriage against movement until the releasing means has again become effective to release said actuating means.

36. The combination of a carriage, printing devices, escapement mechanism for said carriage, means for locking said escapement mechanism in actuated position and consequently locking said carriage, said escapement mechanism being actuated and the locking means being rendered effective during the actuation of any one of said devices in a direction to print, and means to release said locking means at a predetermined point in the return movement of the same device.

37. The combination of a carriage, printing devices, escapement mechanism actuable by said devices, locking means for said escapement mechanism effective therethrough to hold said carriage, said locking means being rendered effective during the actuation of any one of said devices in a direction to print, and means to release said locking means, and consequently said carriage, at a predetermined point in the return movement of the same device.

38. The combination with computing mechanism, of a carriage, an escapement device for said carriage, keys to actuate said escapement device, and means to lock said escapement device in its actuated position, to hold said carriage until an actuated key has returned substantially to its normal position.

39. In a combined typewriting and computing machine, the combination with computing mechanism and a carriage, of an escapement device for said carriage, normally held actuating means for said computing mechanism, releasing means for said actuating means, key-actuated devices to actuate said escapement device and said releasing means, and means controlled by said key-actuated devices to lock said escapement device in its actuated position, to hold the carriage until the operated key-actuated device has returned substantially to its normal position.

40. In a combined typewriting and computing machine, the combination of printing devices, computing mechanism, normally held actuating means for said computing mechanism, releasing means for said actuating means, said releasing means being under the control of said printing devices, and means, including a full-stroke device for said printing devices, to prevent successive computations, in the same denomination, of a digit by successive actuations of the printing device corresponding thereto.

41. In a combined typewriting and computing machine, the combination of printing devices, computing mechanism, an escapement mechanism for changing the denominations in which computation is to be effected, including a universal bar actuable by said printing devices, actuating means for said computing mechanism, each printing device having a connection to start said actuating means, the latter being effective to yieldingly urge said printing devices to print, but ineffective to actuate said universal bar thereby, and means whereby the operative, after starting said actuating means by a printing device, will be compelled to actuate said universal bar by that printing device before the latter can be returned to normal position.

42. In a combined typewriting and computing machine, the combination of printing devices, computing mechanism, normally held actuating means for said computing mechanism, releasing means for said actuating means, a carriage, locking means for said carriage rendered active by any one of said printing devices, and means to prevent said locking means from being rendered inactive until the actuating means has completed its action and the printing device actuated has been restored substantially to its normal position.

43. In a combined typewriting and computing machine, the combination of number-printing devices, computing mechanism, actuating means for said computing mechanism, a carriage, escapement mechanism operable by said number-printing devices, means to lock said carriage to prevent repeated and separate impressions of the same number without effecting computations of the same, and a full-stroke device to prevent, after the actuation of a printing device has been initiated, another actuation of the same printing device without completing the cycle of the first actuation and releasing said escapement mechanism.

44. In a combined typewriting and computing machine, the combination of printing devices, computing mechanism, normally held actuating means for said computing mechanism, releasing means for said actuating means, a carriage, locking means for said carriage, said locking means being rendered active by any one of said printing devices, to prevent separate impressions of the same number without effecting computations of the same, and means to prevent a repeated actuation of any one of said printing devices before the releasing means has again become effective and the locking means ineffective.

45. In a combined typewriting and computing machine, the combination of printing devices, computing mechanism, normally held actuating means for said computing mechanism, a carriage, carriage-escapement mechanism including a dog-rocker, the latter, in its actuated position, being adapted to hold the carriage, releasing means for said actuating means, locking means for said dog-rocker, said locking means being rendered active by said releasing means, means controlled by any one of said printing devices to cause said dog-rocker to be locked by said locking means, and a full-stroke device for said printing devices, said full-stroke device being under the control of said escapement mechanism and effective during the return movement of any one of said printing devices, said full-stroke device being rendered ineffective when the dog-rocker is released from said locking means, the latter being rendered ineffective after the releasing means for said actuating means has again become effective.

46. The combination of a carriage, printing devices, locking means for said carriage, rendered effective during the printing movement of any one of said devices, means to release said locking means during the return movement of the same device, and means to compel a complete return movement of said device to ascertain the releasing of said locking means.

47. The combination of a carriage, printing devices, escapement mechanism actuable by said devices, locking means for said escapement mechanism to hold said carriage, said locking means being rendered effective during the printing movement of any one of said devices, means to release said locking means, and consequently said carriage, during the return movement of the same device, and a full-stroke device to compel a complete return movement of said device to ascertain the releasing of said locking means.

48. In a combined typewriting and computing machine, the combination of number-printing devices, including numeral keys, computing mechanism, actuating means for said computing mechanism, and mechanism for starting said actuating means, including a connection with each of said number-printing devices, whereby actuation of any one of the latter will start the actuating means, each of said connections being yieldable in one direction, the actuating means being rendered effective in the initial part of the depression of a numeral key to yieldingly urge, through the corresponding connection, the corresponding printing device to print, but being ineffective to effect such printing without assistance from the depressed key.

49. In a combined typewriting and computing machine, in combination, number-printing devices, including numeral keys, computing mechanism, a motor-drive for said computing mechanism, and means whereby, in the normal actuation of the numeral keys, a key in the initial part of its movement will start said motor-drive, thus subjecting the key to an increased resistance, and the motor-drive, when started, will assist the key in effecting printing, thus compensating for the increased resistance in the initial part of the key-stroke.

50. In a combined typewriting and computing machine, in combination, a traveling carriage, numeral keys, a carriage-escapement mechanism, computing mechanism, actuating mechanism normally urged in a direction to actuate said computing mechanism, restraining means for said actuating mechanism, and numeral-key-actuated means whereby said restraining means may be released and said escapement mechanism actuated without printing.

51. In a combined typewriting and computing machine, in combination, a traveling carriage, numeral keys, a carriage-escapement mechanism, computing mechanism, actuating mechanism normally urged in a direction to actuate said computing mechanism, restraining means for said actuating mechanism, numeral-key-actuated means whereby said restraining means may be released and said escapement mechanism actuated without printing, and means to prevent the completion of such actuation of the escapement mechanism until the computing mechanism has completed the computation of the number corresponding to the key depressed.

52. In a combined typewriting and computing machine, in combination, a traveling carriage, numeral keys, a carriage-escapement actuable by said keys, computing mechanism, actuating means therefor, and means whereby a slow depression of each of said keys will cause actuation of said computing mechanism by its actuating means and actuation of said escapement without printing.

53. In a combined typewriting and computing machine, in combination, a traveling carriage, numeral keys, a carriage-escapement actuable by said keys, computing mechanism, actuating means therefor, means whereby a slow depression of each of said keys will cause actuation of said computing mechanism by its actuating means and actuation of said escapement without printing, and means to prevent the complete release of said carriage by said escapement before the computation initiated by said key has been completed.

54. In a combined typewriting and computing machine, in combination, a traveling carriage, numeral keys, printing devices actuable by said keys, an escapement mechanism controlled by said keys, computing mechanism, actuating means for said computing mechanism normally urged to actuate the same, and key-controlled restraining means for said actuating means, the actuating means when freed acting to assist the keys in actuating the printing devices, and the relation of the parts being such that computation and feeding of the carriage may be effected with or without printing by actuating the keys accordingly.

55. In a combined typewriting and computing machine, the combination of computing mechanism, actuating means for said computing mechanism, number keys, releasing means for said actuating means, a non-compute key, case-shifting means, and an element carried by said case-shifting means to be actuated by either the non-compute key or the case-shifting means to render said releasing means ineffective, so that the number keys may be actuated without effecting computations.

56. In a combined typewriting and computing machine, the combination of computing mechanism, actuating means for said computing mechanism, number keys, releasing means for said actuating means, a non-compute key, case-shifting means including a shift frame, and a pivoted element carried by said shift frame, said element being adapted to be swung about its pivot by the non-compute key, or to swing with the shift frame when the latter is actuated, the movement of said element by either the non-compute key or the case-shifting means being effective to render said releasing means ineffective, so that the number keys may be actuated without effecting computations.

57. In a combined typewriting and computing machine, in combination, a traveling carriage, numeral keys, printing devices actuable by said keys, an escapement mechanism controlled by said keys, computing mechanism, actuating means for said computing mechanism normally urged to actuate the same, key-controlled restraining means for said actuating means, the actuating means when freed acting to assist the keys in actuating the printing devices, and the relation of the parts being such that computation and feeding of the carriage may be effected with or without printing by actuating the keys accordingly, and means to prevent the completion of the action of the escapement mechanism until the computing action has been completed.

58. In a combined typewriting and computing machine, the combination of a carriage, a holding device for said carriage, comprising a dog movable to and from effective position, a shaft on which said dog is fixed, an arm fixed on said shaft, a pin carried by said arm, a reciprocable member having a cam-slot to receive said pin, said slot comprising an effective portion to move said dog to and from effective position and a dwell portion to lock said dog in effective position, and two guiding devices for said reciprocable member acting thereon at considerable distances apart to render the reciprocation thereof substantially rectilinear, one of said devices being adjacent said pin.

59. In a computing machine, in combination, numeral-keys, a driving shaft, a driven shaft, arms on the driven shaft, one for each numeral-key, cams on the driving shaft, one for each numeral-key and adapted to actuate the corresponding arms in proportion to the values of the corresponding numeral-keys, said arms and said cams normally being displaced relatively to each other along said shafts, so that the cams will be ineffective to engage the corresponding arms, normally ineffective stop devices adapted to stop said driven shaft in different positions in accordance with the numeral-keys depressed, and means whereby depression of a numeral-key will cause the corresponding arm and cam to be brought into effective relation and the corresponding stop device to be rendered effective.

60. In a computing machine, in combination, numeral-keys, a driving shaft, a driven shaft, arms on the driven shaft, one for each numeral-key, cams on the driving shaft, one for each numeral-key and adapted to actuate the corresponding arms in proportion to the values of the corresponding numeral-keys, said arms and said cams normally being displaced relatively to each other along said shafts, so that the cams will be ineffective to engage the corresponding arms, normally ineffective stop devices adapted to stop said driven shaft in different positions in accordance with the numeral-keys depressed, means whereby depression of a numeral-key will cause the corresponding arm and cam to be brought into effective relation and the corresponding stop device to be rendered effective, and adjusting means comprising screws whereby the relation between any cam and the corresponding arm may be adjusted by turning the corresponding screw.

61. In a computing machine, in combination, numeral-keys, a driving shaft, a driven shaft, arms on the driven shaft, one for each numeral-key, cams on the driving shaft, one for each numeral-key and adapted to actuate the corresponding arms in proportion to the values of the corresponding numeral-keys, said arms and said cams normally being displaced relatively to each other along said shafts, so that the cams will be ineffective to engage the corresponding arms, normally ineffective stop devices adapted to stop said driven shaft in different positions in accordance with the numeral-keys depressed, means whereby depression of a numeral-key will cause the corresponding arm and cam to be brought into effective relation and the corresponding stop device to be rendered effective, adjusting means comprising screws whereby the relation between any cam and the corresponding arm may be adjusted by turning the corresponding screw, and adjusting means comprising screws whereby the action of said stop devices may be varied so as to stop the driven shaft at the proper time and prevent overthrow.

62. In a computing machine, in combination, numeral-keys, a driving shaft, a driven shaft, arms on the driven shaft, one for each numeral-key, cams on the driving shaft, one for each numeral-key and adapted to actuate the corresponding arms in proportion to the values of the corresponding numeral-keys, said arms and said cams normally being displaced relatively to each other along said shafts, so that the cams will be ineffective to engage the corresponding arms, normally ineffective stop devices adapted to stop said driven shaft in different positions in accordance with the numeral-keys depressed, means whereby depression of a numeral-key will cause the corresponding arm and cam to be brought into effective relation, and the corresponding stop device to be rendered effective, and adjusting means comprising screws whereby the action of said stop devices may be varied so as to stop the driven shaft at the proper time and prevent overthrow.

63. In a computing machine, in combination, numeral-keys, a driving shaft, a driven shaft, arms on the driven shaft, one for each numeral-key, cams on the driving shaft, one for each numeral-key and adapted to actuate the corresponding arms in proportion to the values of the corresponding numeral-keys, said arms and said cams normally being displaced relatively to each other along said shafts, stop devices adapted to stop said driven shaft at points corresponding to the numeral-keys depressed, said devices comprising members fixed on said driven shaft and abutments normally in ineffective positions, and means whereby depression of a numeral-key will cause the corresponding cam and arm to be brought into effective relation and the corresponding abutment to be brought into the path of the corresponding member fixed on the driven shaft.

64. In a computing machine, in combination, numeral-keys, a driving shaft, a driven shaft, arms on the driven shaft, one for each numeral-key, cams on the driving shaft, one for each numeral-key and adapted to actuate the corresponding arms in proportion to the values of the corresponding numeral-keys, said arms and said cams normally being displaced relatively to each other along said shafts, stop devices adapted to stop said driven shaft at different positions in accordance with the numeral-keys depressed, said devices comprising members mounted on said driven shaft to rotate therewith and abutments adapted to co-operate with said members, said members and abutments being normally positioned in ineffective relation with respect to each other, and means whereby depression of a numeral-key will cause the corresponding arm and cam to be brought into effective relation and the corresponding stop member and abutment to be brought into effective relation.

65. In a combined typewriting and computing machine, the combination with computing mechanism and number-keys, of driving means to actuate said computing mechanism, a holding pawl for said driving means, key-controlled means to actuate said holding pawl to release said driving means, and means to release said holding pawl from said key-controlled means after the driving means has been released.

66. In a combined typewriting and computing machine, the combination of computing mechanism, driving mechanism comprising a shaft, devices including valuation devices on said shaft, said shaft and said devices being so formed that, when the latter are placed over one end of said shaft, they will be held against rotation relative to said shaft, but may be moved longitudinally thereof to desired positions, and means to firmly secure said devices against movement longitudinally of said shaft.

HENRY L. PITMAN.

Witnesses:
EDITH B. LIBBEY,
JENNIE P. THORNE.